United States Patent [19]

Letwin

[11] Patent Number: 5,371,885
[45] Date of Patent: Dec. 6, 1994

[54] HIGH PERFORMANCE FILE SYSTEM

[75] Inventor: James G. Letwin, Kirkland, Wash.

[73] Assignee: Microsoft Corporation, Redmond, Wash.

[21] Appl. No.: 400,533

[22] Filed: Aug. 29, 1989

[51] Int. Cl.⁵ .............................................. G06F 12/02
[52] U.S. Cl. .............................. 395/600; 364/DIG. 1; 364/283.1; 364/282.3
[58] Field of Search ........................................ 395/600; 364/DIG. 1 MS File

[56] References Cited

U.S. PATENT DOCUMENTS

| | | | |
|---|---|---|---|
| 4,435,752 | 3/1984 | Winkelman | 364/DIG. 1 |
| 4,468,728 | 8/1984 | Wang | 364/DIG. 1 |
| 4,825,354 | 4/1989 | Agrawal et al. | 364/DIG. 1 |
| 4,945,475 | 7/1990 | Bruffey et al. | 364/DIG. 1 |
| 4,953,080 | 8/1990 | Dysart et al. | 364/DIG. 1 |
| 5,008,820 | 4/1991 | Christopher, Jr. et al. | 364/DIG. 1 |
| 5,034,914 | 7/1991 | Osterlund | 364/DIG. 2 |
| 5,047,918 | 9/1991 | Schwartz et al. | 364/DIG. 1 |

OTHER PUBLICATIONS

Maurice J. Bach, "The Design of the UNIX Operating System", Prentice-Hall, London, 1986, pp. 22–81.
Proceedings of the Summer 1987 Usenix Conference, Jun. 8, 1987, Phoenix, Arz., Matt Koehler, "GFS Revisited or How I Lived With Four Different Local File Systems", pp. 291–305.
IBM Technical Disclosure Bulletin, vol. 30, No. 6, Nov. 1987, New York, N.Y., "Directory for Disk With Write-Once Storage Medium", pp. 137–138.

Primary Examiner—Thomas M. Heckler
Attorney, Agent, or Firm—Seed and Berry

[57] ABSTRACT

A system and method for allocating contiguous portions of memory to a file. On or more file nodes are provided for allocating memory to one or more files, and the location of these file nodes is maintained. Within these file nodes, the location of one or more runs of contiguous portions of memory are maintained. These contiguous portions of memory are allocated to a file in accordance with the corresponding file node. In one embodiment, the file nodes can be extended in a binary tree structure of additional nodes each storing locations of runs of contiguous portions of memory.

70 Claims, 17 Drawing Sheets

Microfiche Appendix Included
(385 Microfiche, 4 Pages)

HIGH PERFORMANCE FILE SYSTEM

Included in the specification is Appendix I, which is four sheets of microfiche containing 385 frames.

FIELD OF THE INVENTION

This invention relates to the field of computer control systems and more specifically to a method and means for facilitating communication between the devices which comprise a computer system.

BACKGROUND OF THE INVENTION

Computer systems typically comprise a central processing unit, random access memory, read only memory, and a variety of peripheral devices such as data input devices, data output devices, and a variety of non-volatile data storage devices such as floppy disks and fixed or hard disks. Communication between the respective devices in a computer system is typically controlled by a computer operating system. One well known computer operating system is the MS-DOS operating system available from Microsoft.

In the MS-DOS operating system, a single file system describes and defines the organization of files stored on peripheral devices. In order for the computer system to read or write data in a format recognized by both the computer system and the respective peripheral devices, data must be organized in accordance with this file system. For example, in a conventional floppy disk peripheral device used with the MS-DOS operating system, data on a floppy disk is structured in accordance with a file system known as the FAT file system which is so named because of its use of file allocation tables. The FAT file system is one of the most widely used file systems in the world today. Other file systems may be associated with other types of data storage types of peripheral devices such as tape storage devices.

File systems facilitate communication between the operating system kernel and device dependant drivers and are responsible for converting read and write commands generated by an operating system kernel (as well as functions such as opening and closing files) into a form which may be recognized by the device driver.

When using the MS-DOS operating system, the operating system must be configured to define the relevant file systems to be used with specific peripheral devices employed by the computer system. Once the file systems are defined, file systems remain static or unchanged unless the operating system is modified. This typically requires extensive programming effort and is typically quite time-consuming. It further requires extensive knowledge of the computer operating system and individuals who do not have access to operating system details can not easily modify the file systems.

Furthermore, in prior systems, disk media which contains files of foreign file systems may not by used with the native system. For example, over the years, many computer systems have been developed by a variety of manufacturers, each of which are based on alternate file system structures. With current static file system architectures, disk media from one system typically will not function with another type of system. As computers become more popular, it is increasingly important that files may be shared among all types of computer systems. No system is known which allows disk media from virtually all known computer systems to be automatically recognized and read in a single operating environment. Further, no system is known which allows file systems to be added to a system or modified without the need for altering the computer operating system kernel.

SUMMARY OF THE INVENTION

In summary, the present invention contemplates an improved structure for organizing data in a volume or disk wherein a first disk field comprises a boot block, a second field following said first field comprises a superblock, a third field following said second field comprises a spareblock, and a plurality of bands includes a series of contiguous sectors for storing data wherein each band includes a freespace bitmap indicating sector usage. The freespace bitmap may be located at the head or tail of the bands wherein bitmaps for alternate bands are disposed ajacent to each other. The boot block includes volume name, a volume I.D., and a disk bootstrap program. The super block includes pointers to free space bitmaps, a bad block list, a directory block band and a root directory.

In accordance with the present invention, files and directories are anchored in an Fnode structure. This Fnode structure comprises a plurality of pointers which point to runs of sectors.

Accordingly, it is an object of the present invention to provide an improved file system which offers improved performance over present file systems.

It is still another object of the present invention to provide a file system structure which minimizes disk fragmentation.

It is still another object of the present invention to provide a file system structure which allows rapid and efficient location of files in a designated volume.

BRIEF DESCRIPTION OF THE DRAWINGS

These and other objects may be fully appreciated through the detailed description of the invention below and the accompanying drawings in which.

DETAILED DESCRIPTION OF THE INVENTION

Figure 1A:
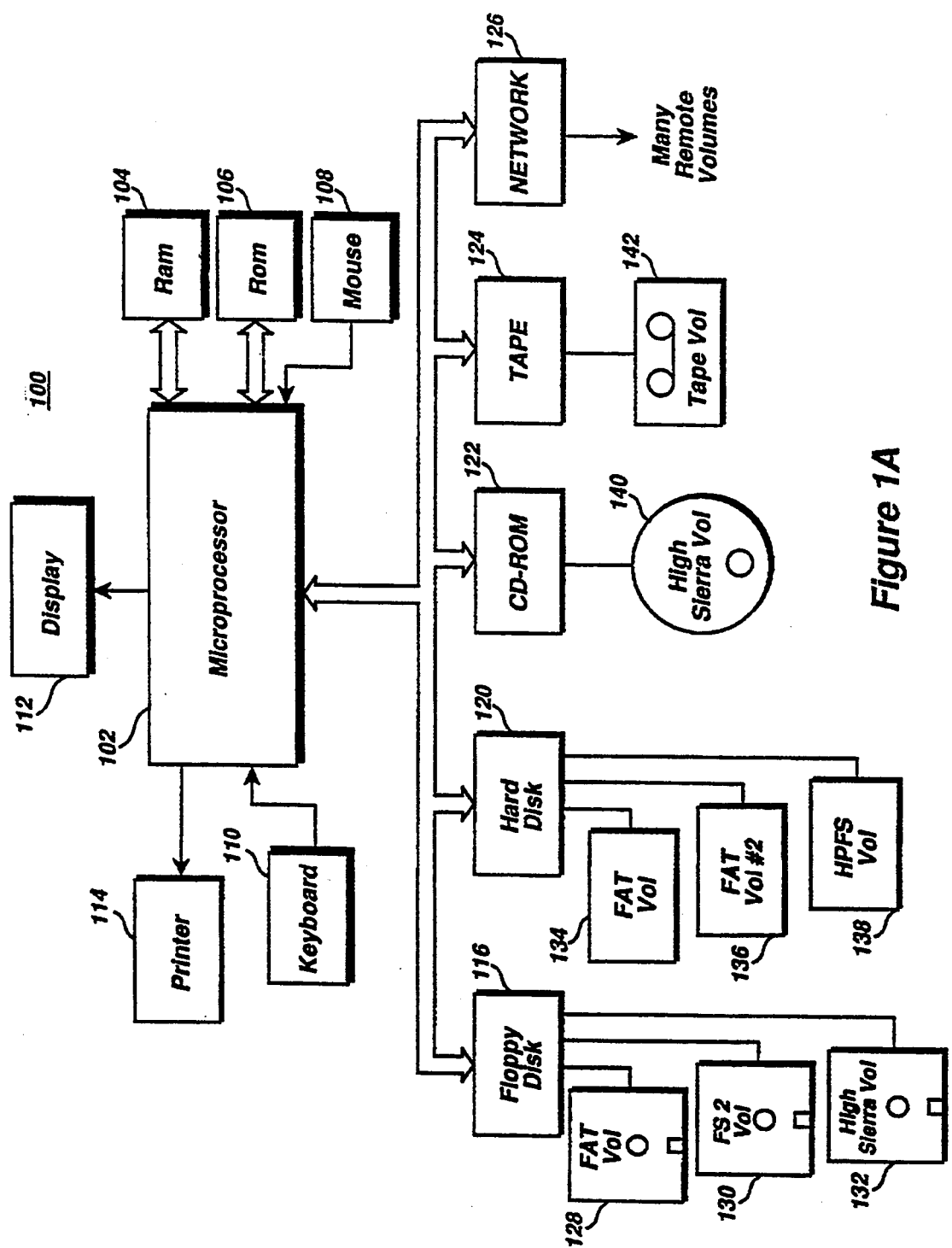
FIG. 1A is a block diagram of a computer system constructed in accordance with the principles of the present invention.

FIG. 1 shows a computer system 100 which is constructed in accordance with the principles of the present invention. The system 100 comprises a central processing unit or microprocessor 102, random access memory 104, read only memory 106, input devices such as a mouse 108 and keyboard 110, output devices such as display 112 and printer 114 and a variety of non-volatile storage devices such as floppy disk drive 116, hard disk drive 120, CD-ROM drive 122, and tape drive 124. In addition, the computer system 100 is adapted for communicating with a network 126. Non-volatile storage means that data is present when the device is powered-off.

In prior systems, an operating system is statically configured with file system drivers wherein each peripheral device is compatible with only one media type and file system driver. If media is placed in a drive which is not compatible with the designated file system driver, the media cannot be successfully accessed. The present invention provides a method and means for automatically mapping media to the file systems associated therewith independent of the peripheral device and without imposing any requirements on the format or location of data on the media, as will be further discussed below. For example, it is contemplated that the floppy drive unit 116 may be used with volumes formatted in accordance with a number of file systems wherein volume 128 is formatted in accordance with the FAT file system, volume 132 is formatted in accordance with the well known High Sierra file system and volume 130 is formatted in accordance with yet another file system. Similarly, various partitions of hard disk 120 may also be formatted in accordance with a number of files systems as indicated by volumes 134, 136 and 138. Similarly, the CD-ROM and tape system 124 may be used with volumes 140, 142, respectively, formatted with their own file systems. Further, network 126 may be coupled to any number of networks having servers which may operate in accordance with their own file systems.

Figure 1B:
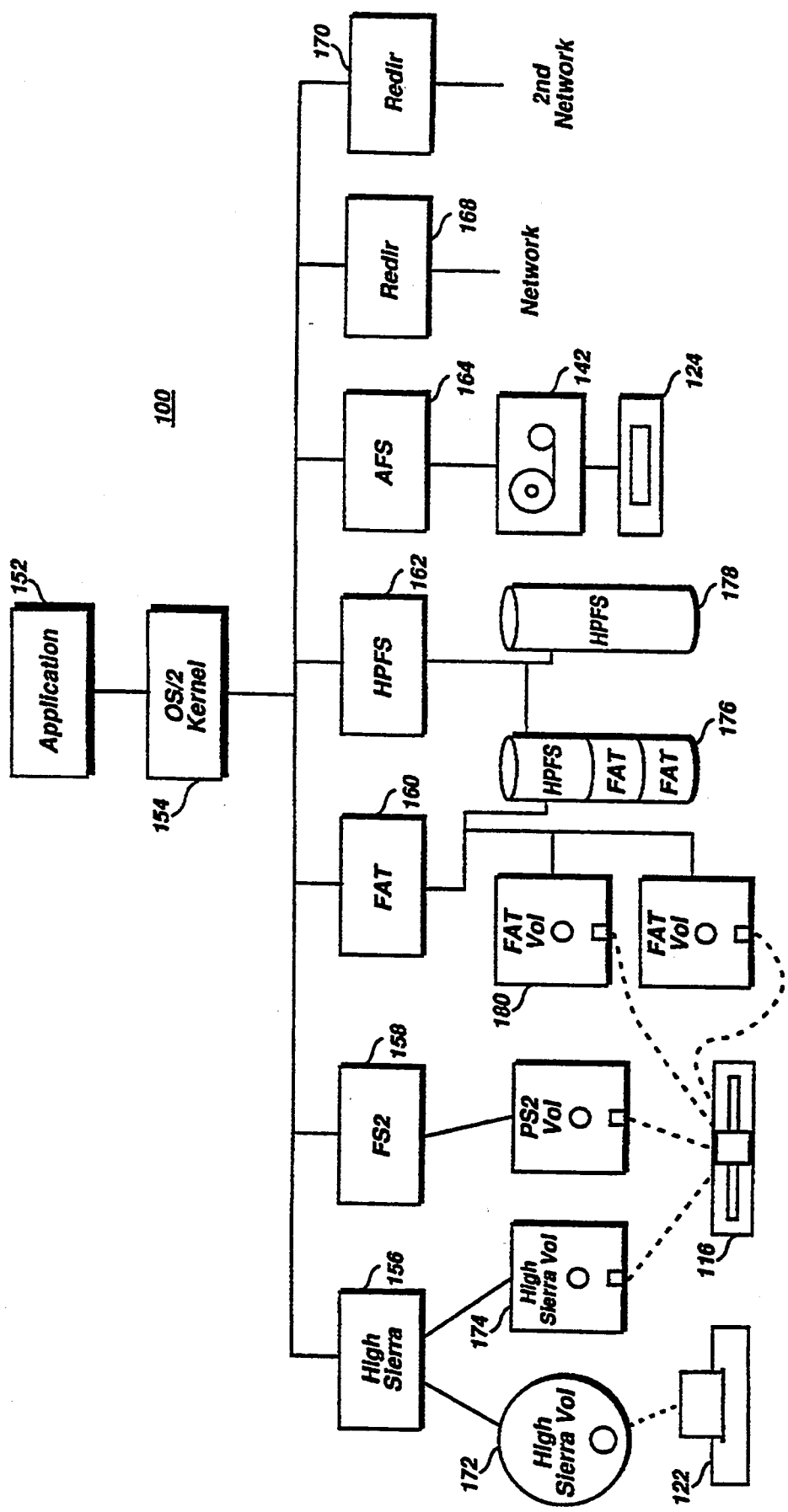
FIG. 1B is a diagram showing the operating and file system architecture the system of FIG. 1A.

The operation of the system 100 is coordinated by an operating system which may be any of a number of well known operating systems. However, the present invention is particularly adapted for use with the OS/2 operating system developed by Microsoft. The structure of the operating environment of the present invention is shown in FIG. 1B. Typically, an application 152 generates file system requests which are processed by kernel 154. The kernel then routes this request to an appropriate file system driver (FSD) 156–170. Any file system driver may cooperate with a number of hardware devices. For example, the High Sierra file system 156 may be used with CD-ROM player 122 and disk drive 116 when preforming file system operations on volumes 172, 174, respectively. Similarly, the FAT file system and the HPFS file systems may both be used for performing file system operations on volumes 176, 178, each of which are resident on hard disk 120. Further, the FAT file system driver may be used with disk drive 116 when performing file system operations on volume 180. Accordingly, the present invention provides a method and means for automatically and dynamically mapping uncertain media to the appropriate file system, regardless of the type and format of the file system.

Figure 2A:
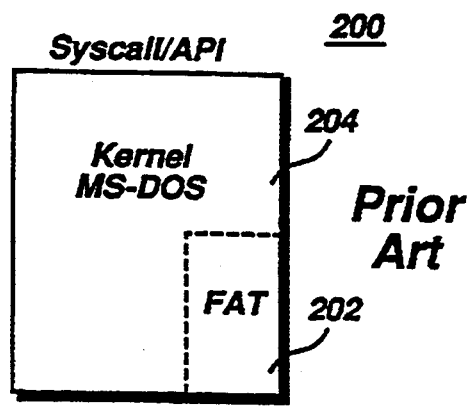
FIGS. 2A is a diagram detailing the file system structure of the MS-DOS operating system.

FIG. 2A shows the file system structure of the prior art MS-DOS operating system. In the MS-DOS operating system 200, the FAT file system 202 is embedded in the operating system kernel 204. Since the FAT file system is integrated into the system kernel, it is difficult to modify. Furthermore, if additional file systems are required, the operating system kernel 204 must be re-written to accommodate them.

Figure 2B:
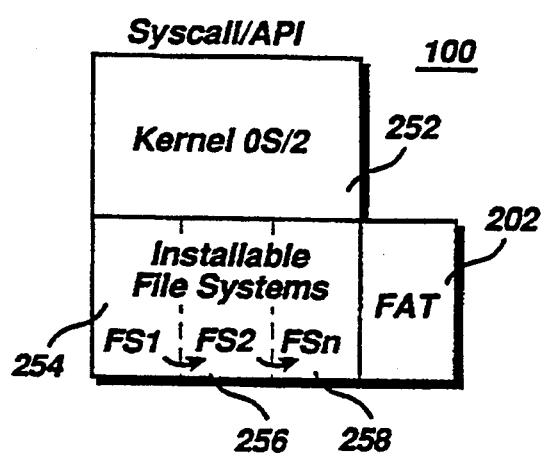
FIG. 2B is a diagram detailing the file system structure of the installable file system of the present invention.

The present invention overcomes the above mentioned problems with the system architecture shown in FIG. 2B. In the system 100, the OS/2 kernel 252 also includes the FAT file system 202 embedded therein. However, the present invention provides a method and means for dynamically attaching file system drivers 254, 256, 258 which are external to the operating system kernel 252. While the system 250 is shown with three installable file system drivers, the present invention is adapted to include a virtually unlimited number of file system drivers.

An installable file system driver (FSD) is analogous in many ways to a device driver. An FSD resides on the disk in a file that is structured like a dynamic-link library (DLL), typically with a SYS or IFS extension, and is loaded during system initialization by IFS=statements in the CONFIG.SYS file. IFS=directives are processed in the order they are encountered and are also sensitive to the order of DEVICE=statements for device drivers. This allows a user to load a device driver for a nonstandard device, load a file system driver from a volume on that device, and so on. Once an FSD is installed and initialized, the kernel communicates with it in terms of logical requests for file opens, reads, writes, seeks, closes, and so on. The FSD translates these requests using control structures and tables found on the volume itself into requests for sector reads and writes for which it can call special kernel entry points called File System Helpers (FsHlps). The kernel passes the demands for sector I/O to the appropriate device driver and returns the results to the FSD.

The procedure used by the operating system to associate volumes with FSDs is referred to as dynamic volume mounting and operates as follows. Whenever a volume is first accessed, or after it has been locked for direct access and then unlocked (for example, by a FORMAT operation), the operating system kernel presents identifying information from the volume to each of the FSDs in seriatum until an FSD recognizes the information. When an FSD claims the volume, the volume is mounted and all subsequent file I/O requests for the volume are routed to the FSD which claimed the volume.

This arrangement provides several advantages over the prior art. For example, if uncertain media is presented to the computer system, the computer system may scan the available file system drivers to locate a file system driver which recognizes the media thus providing for automatic mapping of file system driver to media. Furthermore, file system drivers may be updated without requiring a modification of the operating system kernel. In addition, as new types of peripheral devices are developed, appropriate file system drivers may be added to the operating system without disturbing existing system software.

Figure 3:
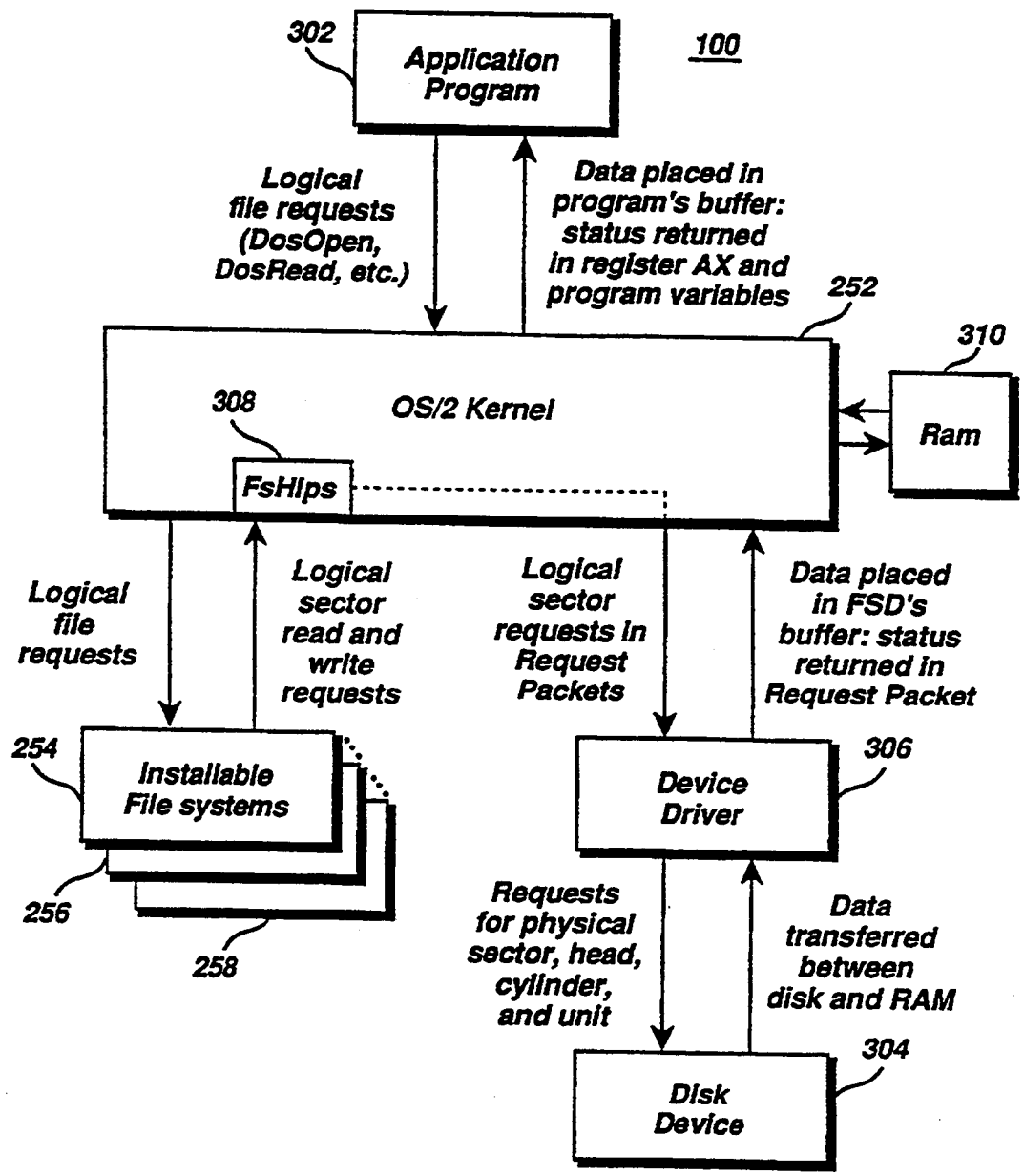
FIG. 3 is a more detailed diagram of the system of FIG. 2B.

A more detailed diagram of the system 100 is shown in FIG. 3. The system 100 includes an operating system kernel 252 which facilitates communication between an application program 302 and data storage devices such as disk device 304. The system 100 includes a device driver 306 which works in conjunction with a file system driver 254-258. While the system 100 is shown as including a single peripheral device 304, the present invention is adapted for use with any number of logical or physical peripheral devices.

In operation, the application program 302 issues logical file requests to the operating system kernel 252 by calling the entry points for the desired function. These functions may include requests to open files (DosOpen), to read files (DosRead), to write files (DosWrite), etc. The operating system kernel 252 passes these requests to the appropriate file system driver 254-258 for the particular volume holding the file. The appropriate installable file system driver then translates the logical file request into requests for reads or writes of logical sectors of the designated media and calls an operating system kernel file system helper 308 to pass these requests to the appropriate device driver 306. File system helpers are discussed in more detail below. The disk driver 306 transforms the logical sector requests from the operating system kernel into requests for specific physical units: cylinders, heads and sectors of the media, and issues commands to the disk device to transfer data between disk media and random access memory 310.

The mapping of physical devices into particular file systems is discussed in further detail below. In the MS-DOS environment, floppy disks are referred to as volumes. Fixed disks (or hard disks) may be partitioned into multiple volumes. This terminology applies to the present invention as well. Briefly, whenever the system 100 is first booted, whenever a volume is first accessed, or whenever the system determines uncertain media is present in disk device 304, the system examines the first file system driver in a linked list of file system drivers. If the file system driver recognizes the volume loaded in the disk device, the file system driver is mounted. Otherwise, the system sequentially polls the available file system drivers until a file system driver which recognizes the media is located. If no installable file system driver is found which recognizes the media of interest, a default file system driver is mounted. In the preferred practice of the present invention, the default file system is the FAT file system mentioned above.

Uncertain media may be detected in several ways. Many disk devices are provided with a mechanical latch mechanism which is exercised when a disk is ejected or installed in the disk device. The latch mechanism typically functions such that the next operation on the drive will indicate that the door has been opened. When the device driver receives this indication, ERROR_UNCERTAIN_MEDIA is returned to the operating system. In systems without mechanical latch mechanisms, it is assumed that media cannot be changed in less than a predetermined time interval. In the preferred practice of the present invention, this interval is assumed to be two seconds. Thus if a particular volume has not been accessed for more than the predetermined interval, the media is presumed to be uncertain.

Figure 4:
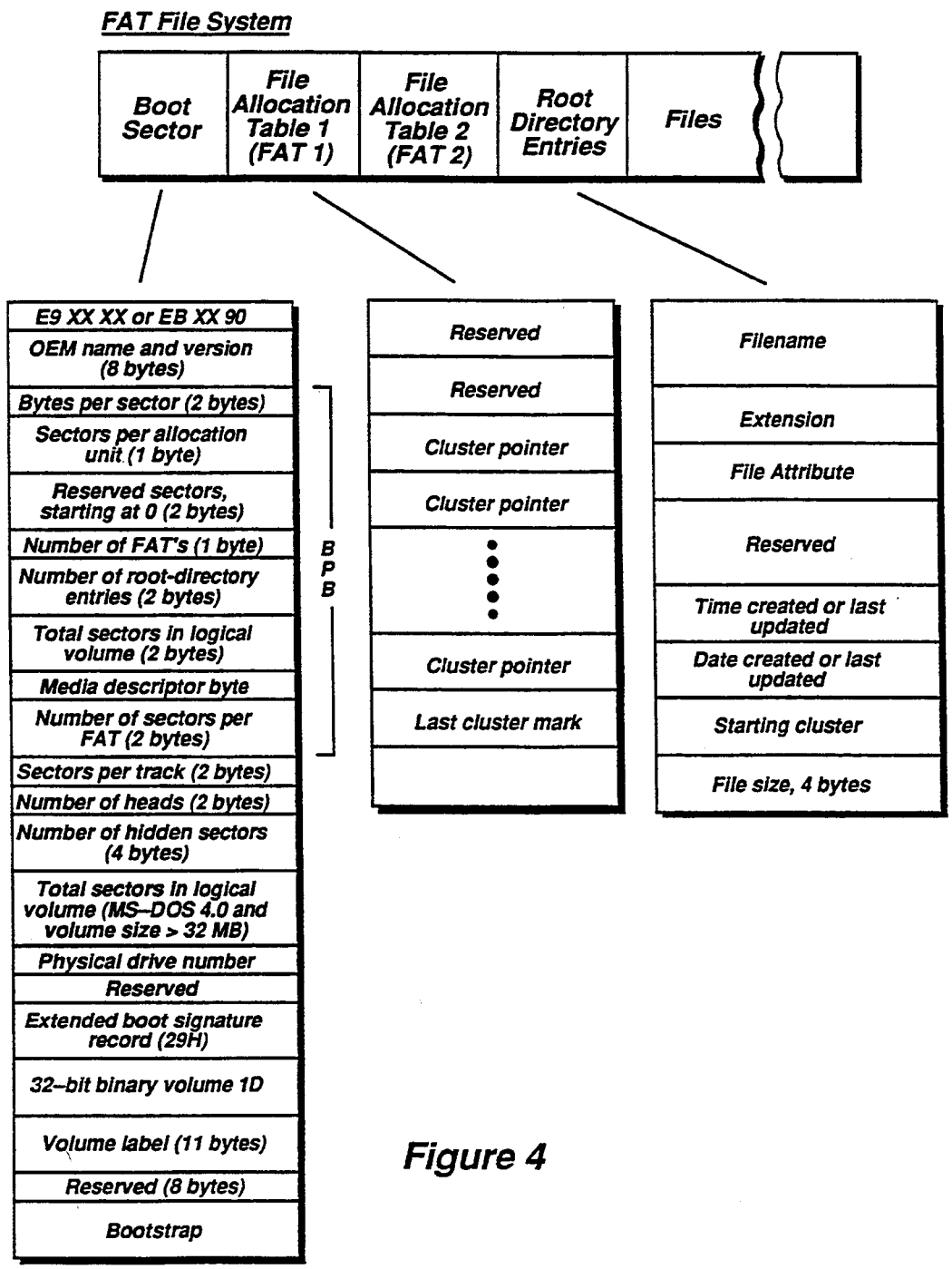
FIG. 4 is a diagram showing the disk format of the FAT file system.

FIG. 4 is a diagram of the disk format of the FAT file system. The FAT file system has been used with the MS-DOS operating system since its inception. A detailed description of the FAT file system may be found in Duncan, "Advance MS DOS Programming", Microsoft Press, 1986, 1988. A brief description of the FAT file system follows. The FAT file system revolves around the File Allocation Table. Each logical volume is associated with its own FAT, which serves two important functions: it contains the allocation information for each file on the volume in the form of linked lists of allocation units and it indicates which allocation units are free for assignment to a file that is being created or extended.

When a disk is formatted in accordance with the FAT file system, a boot sector is written in sector zero. This is followed by one or more file allocation tables. The file allocation tables are followed by a root directory. The root directory is followed by the volume files. The boot sector contains various descriptive information about the volume in an area referred to as the boot parameter block or BPB, information such as a drive number and a volume I.D. as well as a bootstrap routine.

The file allocation table is divided into fields that correspond directly to the assignable clusters on a disk (clusters are power-of-2 multiples of sectors). These fields are typically 16 bits wide. The first two fields in the FAT are reserved. The first reserved FAT entry contains a copy of a media descriptor byte which is also found in the BPB. The remaining reserved fields contain OFFH. The remaining FAT entries describe the use of their corresponding disk clusters. Each file's entry in a directory contains the number of the first cluster assigned to that file, which is used as an entry point into the FAT. From the entry point on, each FAT slot contains the number of the next cluster in the file, until a last-cluster mark is encountered. The FAT file system also provides for the option of maintaining a duplicate of the first file allocation table which may be used if access to a sector in the FAT fails due to a read error, etc.

Following the file allocation tables, is the root directory. The root directory contains 32 byte entries that describe files, other directories, and an optional volume label.

The remainder of the volume after the root directory is known as the files area which may be viewed as pools of clusters, each containing one or more logical sectors. Each cluster has a corresponding entry in the FAT that describes its current use: available, reserved, assigned to a file, or unusable.

The FAT file system provides excellent performance with volumes which are less than 1 Mb. However, as volumes increase in size over 1 Mb, the performance of the FAT file system quickly degrades. This has become an increasingly severe problem as the size of readily available hard disks is rapidly increasing.

When volumes are less than 1 Mb, the FAT is small enough to be retained in random access memory at all times, thus allowing very fast random access to any part of a file. When applied to hard disks or fixed disks, however, the FAT becomes too large to hold in memory and must be paged into memory in pieces. This results in many superfluous disk head movements, thus degrading system throughput. In addition, since information about disk free space is dispersed across many sectors of FAT, it is impractical to allocate file space contiguously, and files become fragmented, further degrading system throughput. Furthermore, the use of relatively large clusters on hard disks results in much wasted space.

Figure 5A:
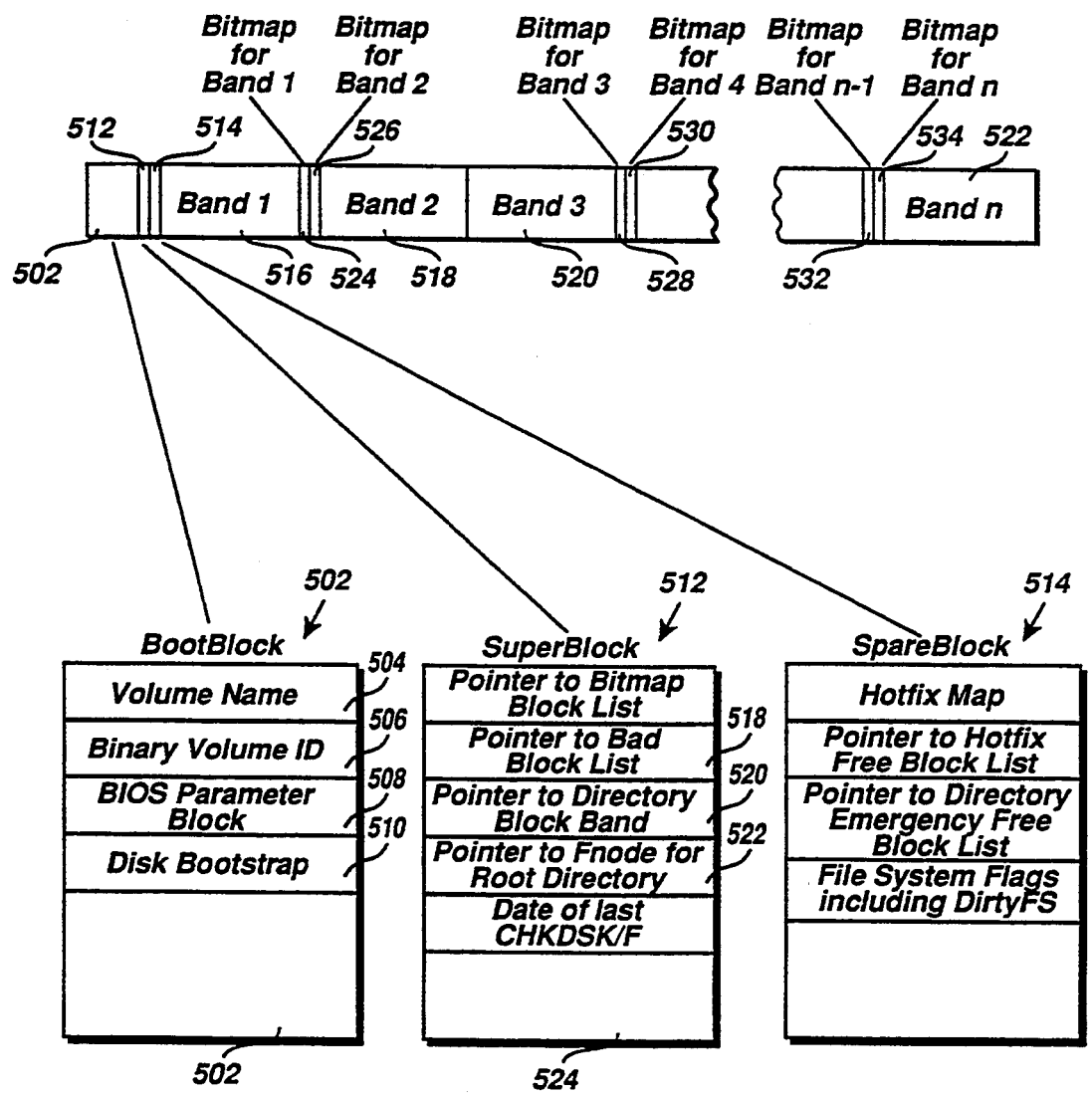
FIGS. 5A-5H are diagrams showing the disk format of the high-performance installable file system of the present invention.

FIGS. 5A-5H are a series of diagrams showing the disk format of one instance of an installable file system. This file system is referred to as the high performance file system (HPFS). The high performance file system of the present invention eliminates the above-mentioned problems with the FAT file system and provides superior performance with all types of disk media. Referring now to FIG. 5A, HPFS volumes can exist on a fixed disk along side of previously defined FAT partition types. HPFS volumes use a sector size of 512 bytes and have a maximum size of 2199 Gb ($2^{32}$ sectors). While primarily designed for use with fixed disks, HPFS is compatible with virtually any type of disk media.

An HPFS volume is required to have very few fixed structures. Sectors 0–15 of a volume (8 Kb) are allocated to the BootBlock 502 and contain a volume name field 504, a 32-bit volume ID field, a BIOS parameter block 508, and a disk bootstrap program 510. The disk bootstrap program 510 can be used in a restricted mode to locate and read operating system files wherever they may be found.

The BootBlock 502 is followed by a SuperBlock 512 and a SpareBlock 514. The SuperBlock 514 is only modified by disk maintenance utilities. It contains pointers 516 which point to free space bitmaps, a bad block list 518, a pointer 520 which points to a directory block band, and a pointer 522 which points to the root directory. It also contains a date field 524 which includes the date the volume was last checked and repaired with CHKDSK. CHKDSK is a well known OS/2 disk utility for detecting and cataloging bad portions of a disk.

The SpareBlock 514 contains various flags and pointers which will be further discussed below. It is modified as the system executes.

The remainder of the volume is divided into 8 Mb bands, e.g. bands 516–522 which are used for storing files. While FIG. 5A shows four 8 Mb bands, HPFS provides for a very large number of bands. Each band is provided with its own free space bitmap, see e.g. bitmaps 524–534. Each bit in the freespace bitmaps represents a sector. A bit is 0 if the sector is in use and 1 of the sector is available. The bitmaps are located at the head or tail of a band so that two bitmaps are adjacent between alternate bands. This allows the maximum contiguous free space that can be allocated to a file to be 16 Mb although the bitmap bandsize may be modified to accommodate files of virtually any size. One band, located at or towards the seek center of the disk, is called the directory block band and receives special treatment as will be further discussed below.

Figure 5B:
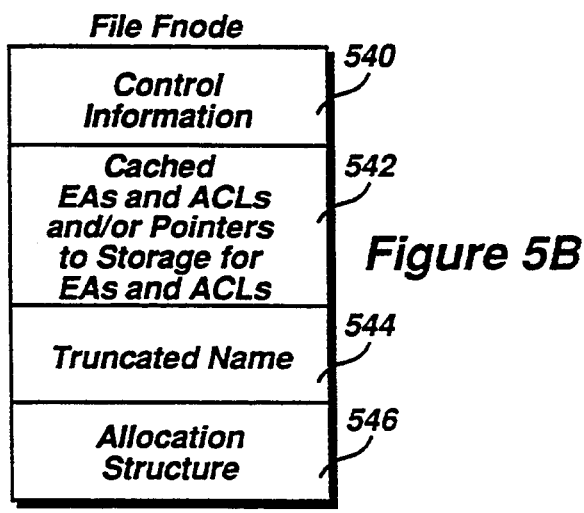
Figure 5C:
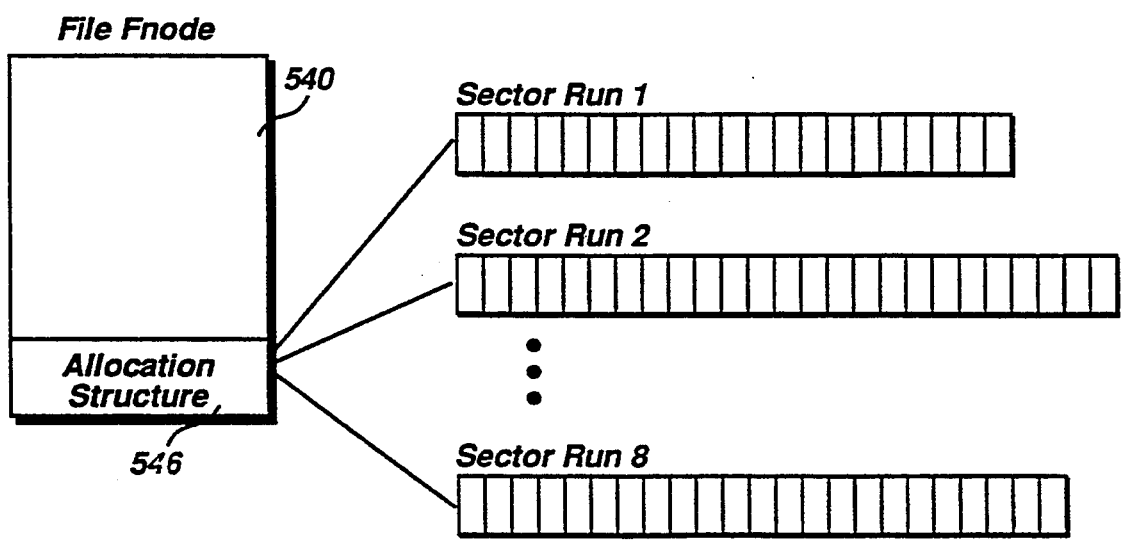

Every file or directory on an HPFS volume is anchored on a fundamental file system object called an Fnode which is shown in FIGS. 5B–5C. The Fnode 530 is the first sector allocated to a file or directory, and is pointed to by field 522 in the Superblock 504. Each Fnode occupies a single sector and contains control and access information field 540 used internally by the file system, an area 542 for storing extended attributes (EA) and access control lists (ACLs), a field 544 if indicating the length and the first 15 characters of the name of the associated file or directory, and an allocation structure 546 as shown in FIG. 5B. An Fnode is always stored near the file or directory that it represents.

The allocation structure 546 shown in FIG. 5C takes several forms, depending on the size and degree of continuity of the file or directory. The HPFS of the present invention views a file as a collection of one or more runs or extents of one or more contiguous sectors. Each run is symbolized by a pair of double-words: a 32-bit starting sector number and a 32-bit length in sectors (this is referred to as run length encoding). From an application programs point of view, the extents are invisible; the file appears as a seamless stream of bytes.

The space reserved for allocation information in an Fnode can hold pointers to as many as eight runs of sectors of up to 16 Mb each. Reasonably small files of highly contiguous size can, therefore, be completely described within the Fnode.

Figure 5D:
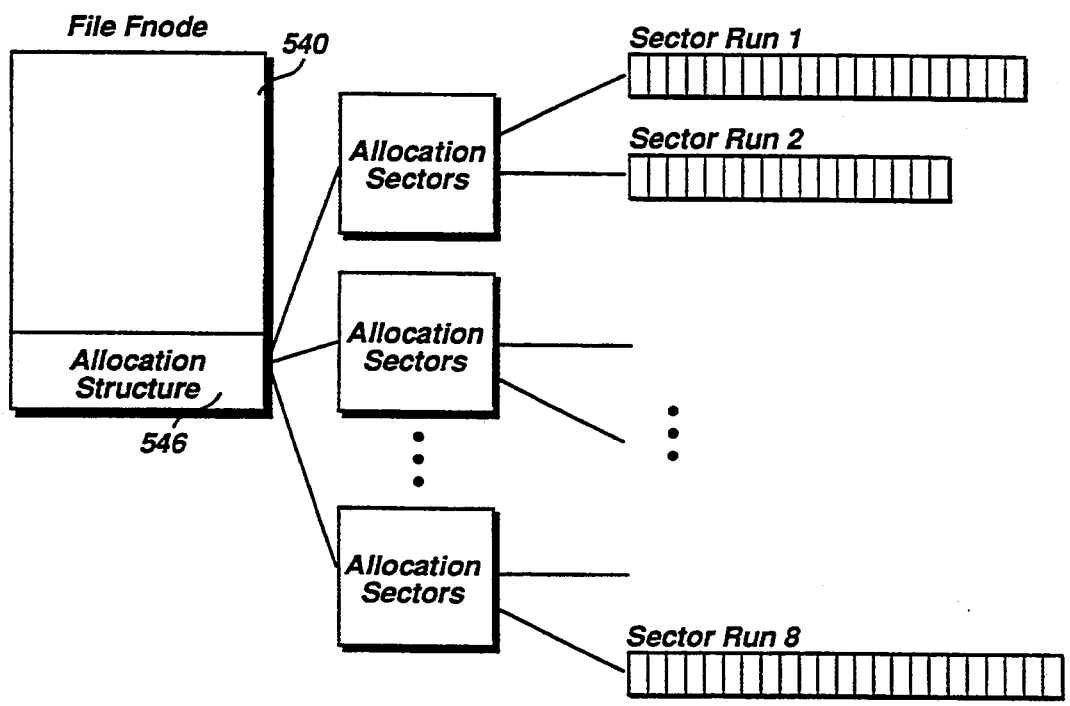

The HPFS employs a new method to represent the location of files that are too large or too fragmented for the Fnode and consist of more than eight runs. The Fnode's allocation becomes the root for a B+ tree of allocation sectors, which in turn contain the actual pointers to the file's sector runs as shown in FIG. 5D. The concept of B+ trees and B− trees is discussed in detail below. The Fnode's root has room for 12 elements. Each allocation sector can contain, in addition to various control information, as many as 40 pointers to sector runs. Therefore, a two level allocation B+ Tree can describe a file of 480(12*40) sector runs, with a theoretical maximum size of 7.68 Gb (12*40*16 Mb) in the preferred practice of the present invention.

In the unlikely event that a two-level B+ Tree is not sufficient to describe a highly fragmented file, the HPFS file system introduces additional levels in the tree as required. Allocation sectors in the intermediate levels can hold as many as 60 internal (nonterminal) B+ tree nodes, which means that the descriptive ability of this structure rapidly grows to numbers that are extremely large. For example, a three-level allocation B+ Tree can describe as many as 28,800 (12*60*40) sector runs.

Run-length encoding and B+ Trees of allocation sectors are a memory efficient way to specify a file's size and location and offer several significant advantages over the prior art. Translating a logical file offset into a sector number is extremely fast: the file system merely traverses the list (or B+ Tree of lists) of run pointers, summing up run sizes until the correct range is found. It can then identify the sector within the run with a simple calculation. Run-length encoding also makes it trivial to extend the file logically if the newly assigned sector is contiguous with the file's previous last sector; the file system merely increments the size double-word of the file's last run pointer and clears the sector's bit in the appropriate freespace bitmap.

Figure 5E:
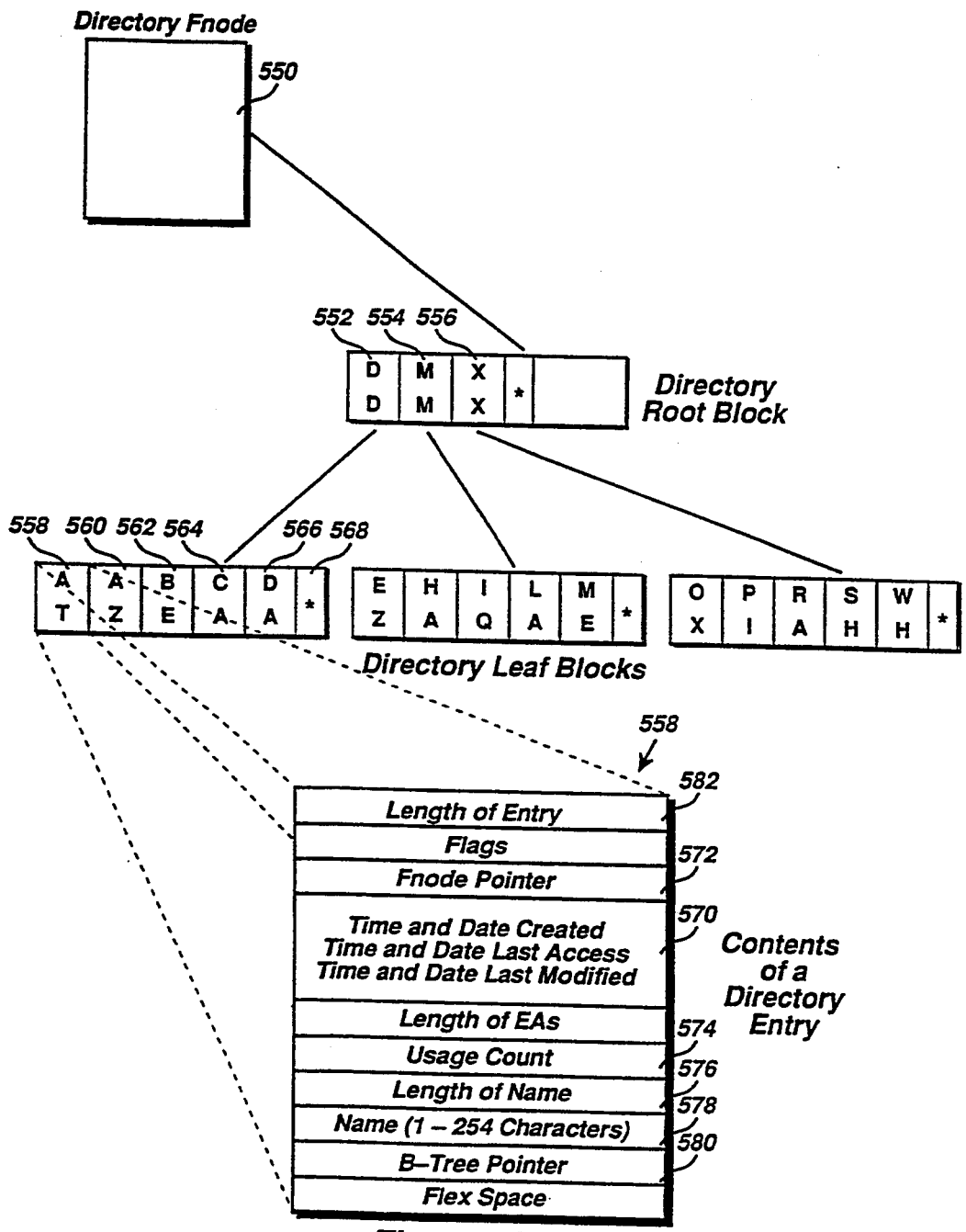

Directories, like files, are anchored on Fnodes. A pointer 522 to the Fnode for the root directory is found in the SuperBlock 512. FIG. 5E shows the directory structure of the present invention wherein a directory Fnode 550 is shown. The Fnodes for directories other than the root are reached through subdirectory entries in their parent directories.

Directories are built up from 2 Kb directory blocks, which are allocated as four consecutive sectors on the disk and can grow to any size. See e.g. directory blocks 552, 554, 556. The file system attempts to allocate directory blocks in the directory band, which is located at or near the seek center of the disk. Once the directory band is full, the directory blocks are allocated wherever space is available.

Each 2 Kb directory block may contain from one to many directory entries. See e.g. entries 558–568. A directory entry contains several fields, including a field 570 for time and date stamps, a field 572 which contains an Fnode pointer, a usage count field 574 for use by disk maintenance programs (which are well known), a field 576 which contains the length of the file or directory name, a field 578 for the name itself, and a field 580 which contains B− Tree pointer, as shown in FIG. 5E.

Each directory entry begins with a word 582 that contains the length of the entry. This provides for a variable amount of flex space at the end of each entry, which can be used by special versions of the file system and allows the directory block to be traversed very quickly.

The number of entries in a directory block varies with the length of names. If the average filename length is 13 characters, an average directory block will hold approximately 40 entries. The entries in a directory block are sorted by the binary lexical order of their name fields. The last entry is a dummy record that marks the end of the block.

When a directory gets too large to be stored in one block, it increases in size by the addition of 2 Kb blocks that are organized as a B− Tree. When searching for a specific name, the file system traverses a directory block until it either finds a match or finds a name that is lexically greater than the target. In the latter case, the file system extracts the B− Tree pointer from the entry. If this pointer points to nowhere, the search failed; otherwise, the file system follows the pointer to the next pointer to the next directory block in the tree and continues the search.

Assuming 40 entries per block, a two-level tree of directory blocks can hold 1640 directory entries and a three level tree can hold 65,640 entries. In other words, a particular file can be found (or shown not to exist) in a typical directory of 65,640 files with a maximum of three disk accesses. The actual number of disks accesses depends on cache contents and the location of the file's name in the directory block B− Tree. This presents a vast improvement over the FAT file system where in a worst case, 4,000 sectors would have to be read to establish whether a file was present in a directory containing the same number of files.

The B− Tree directory structure of the HPFS has interesting implications beyond its effect on open and find operations. A file creation, renaming, or deletion may result in a cascade of complex operations, as directory blocks are added or freed or names are moved from one block to the other to keep the tree balanced. In fact, a rename operation could fail for lack of disk space even though the file itself is not growing. In order to avoid this problem, the HPFS reserves a small pool of free blocks that can be drawn from in a directory emergency; a pointer to this pool is preferably stored in the SpareBlock.

File attributes are information about a file that is maintained by the operating system outside the file's overt storage area.

The HPFS of the present invention supports Extended Attributes (EAs) taking the form name=value except that the value portion can be either a null-terminated (ASCIIZ) string or binary data. In the preferred practice of the present invention, each file or directory can have a maximum of 64 Kb of EAs attached to it although this limit may be readily modified.

The storage method for EAs can vary. If the EAs associated with a given file or directory are small enough, they will be stored in the Fnode. If the total size of the EAs is too large, they are stored outside the Fnode in sector runs, and a B+ Tree of allocation sectors is created to describe the runs. If a single EA gets too large, it may be pushed outside the Fnode into a B+ Tree of its own.

The present invention provides an improvement to the OS/2 kernel API functions DOSQFileInfo and DosSetFileInfo that allow application programs to manipulate extended attributes for files. The present invention further provides two new functions DOSQPathInfo and DosSetPathInfo which may be used to read or write the EAs associated with arbitrary pathnames. An application program may either request the value of a specific EA (supplying a name to be matched) or can obtain all of the EAs for the file or directory at once. The support of EAs facilitates the use of object oriented application programming. Information of almost any type can be stored in EAs, ranging from the name of the application that owns the file, names of dependent files, icons, and executable code.

The HPFS attacks potential bottlenecks in disk throughput at multiple levels. It uses advanced data structures, contiguous sector allocation, intelligent caching, read-ahead, and deferred writes in order to boost performance. First, the HPFS matches its data structures to the task at hand: sophisticated data structures (B− Trees and B+ Trees) for fast random access to filenames, directory names, and lists of sectors allocated to files or directories, and simple compact data structures (bitmaps) for locating chunks of free space of the appropriate size. The routines that manipulate these data structures are preferably written in assembly language.

The main objective of the HPFS is to assign consecutive sectors to files whenever possible. The time required to move the disk's read/write head from one track to another far outweighs the other possible delays, so the HPFS avoids or minimizes such head movements by allocating file space contiguously and by keeping control structures such as Fnodes and freespace bitmaps near the things they control. Highly contiguous files also help the file system make fewer requests of the disk driver for more sectors at a time, allow the disk driver to exploit the multisector transfer capabilities of the disk controller, and reduce the number of disk completion interrupts that must be serviced.

Keeping files from becoming fragmented in a multitasking operating system in which many files are being updated concurrently is a feature not found in the prior art. One strategy the HPFS uses is to scatter newly created files across the disk in separate bands, if possible, so that the sectors allocated to the files as they are extended will not be interleaved. Another strategy is to preallocate 4 Kb of contiguous space to the file each time it must be extended and give return any excess when the file is closed.

If an application knows the ultimate size of a new file in advance, it may assist the HPFS by specifying an initial file allocation when it creates a file. The system then searches all the free space bitmaps to find a run of consecutive sectors large enough to hold the file. That failing, it searches for two rounds that are half the size of the file, and so on.

The HPFS relies on several different kinds of caching to minimize the number of physical disk transfers it requests. It caches sectors, as did the FAT file system. But unlike the FAT file system, the HPFS manages very large caches efficiently and adjusts sector caching on a per-handle basis to the manner in which a file is used. The HPFS also caches pathnames and directories, transforming disk directory entries in to an even more compact and efficient in memory representation.

Another technique that the HPFS uses to improve performance is to preread data it believes the program is likely to need. For example, when a file is opened, the file system will preread and cache the Fnode and the first few sectors of the file's contents. If the file is an executable program or the history information in the file's Fnode shows that an open operation has typically been followed by an immediate sequential read of the entire file, the file system will preread and cache much more of the file's contents. When a program issues relatively small read requests, the file system always fetches data from the file in 2 Kb chunks and caches the excess, allowing most read operations to be satisfied from the cache.

The HPFS of the present invention relies heavily on lazy writes based on OS/2 multitasking capabilities (sometimes called deferred writes or write behind) to improve performance. For example, when a program requests a disk write, the data is placed in the cache and the cache buffer is flagged as dirty (that is, inconsistent with the state of the data on disk). When the disk becomes idle or the cache becomes saturated with dirty buffers, the file system uses a captive thread from a daemon process to write the buffers to disk, starting with the oldest data. Captive threads and daemon processes are described in a series of texts: Hastings, et al. "Microsoft OS/2 Programmers Reference", Microsoft Press, 1989.

In general, lazy writes mean that programs run faster because their read requests will typically not be stalled waiting for a write request to complete. For programs that repeatedly read, modify, and write a small working set of records, it also means that many unnecessary or redundant physical disk writes may be avoided. Lazy writes have their certain dangers, and therefore, the present invention provides that a program can defeat them on a per-handle basis by setting the write-through flag in the OpenMode parameter for DosOPen, or it can commit data to disk on a per-handle basis with the DosBufReset function. Both DosOpen and DosBufReset functions are available in current versions of OS/2.

The extensive use of lazy writes makes it imperative for the HPFS to be able to recover gracefully from write errors under any but the most dire circumstances. For example, by the time a write is known to have failed, the application has long since gone on its way under the illusion that it has safely shipped the data into disk storage. The errors may be detected by hardware (such as a "sector not found" error returned by the disk adapter), or they may be detected by the disk driver in spite of the hardware during a read-after-write verification of the data.

The primary mechanism for handling write errors is referred to as a hotfix. When an error is detected, the file system takes a free block out of a reserved hotfix pool, writes the data to that block, and updates the hotfix map. (The hotfix map is simply a series of pairs of doublewords, with each pair containing the number of a bad sector associated with the number of its hotfix replacement.) A copy of the hotfix map is then written to the SpareBlock, and a warning message is displayed to let the user know that there is a problem with the disk device.

Each time the file system requests a sector read or write from the disk driver, it scans the hotfix map and replaces any bad sector numbers with the corresponding good sector holding the actual data.

One of CHKDSK's duties is to empty the hotfix map. For each replacement block on the hotfix map, it allocates a new sector that is in a favorable location for the file that owns the data, moves the data from the hotfix block to the newly allocated sector, and updates the file's allocation information (which may involve rebalancing allocation trees and other elaborate operations). It then adds the bad sector to the bad block list, releases the replacement sector back to the hotfix pool, deletes the hotfix entry from the hotfix map, and writes the updated hotfix map to the SpareBlock.

The HPFS maintains a Dirty FS flag in the SpareBlock of each HPFS volume. The flag is cleared when all files on the volume have been closed and all dirty buffers in the cache have been written out or, in the case of the boot volume, when Shutdown has been selected and has completed its work.

During the OS/2 boot sequence, the file system inspects the DirtyFS flag on each HPFS volume and, if the flag is set, will not allow further access to that volume until CHKDSK has been run. If the DirtyFS flag is set on the boot volume, the system will run CHKDSK automatically.

In the event of a truly major catastrophe, such as loss of the SuperBlock or the root directory, the HPFS is designed to give data recovery the best possible chance of success. Nearly every type of crucial file object, including Fnodes, allocations sectors, and directory blocks, is doubly linked to both its parent and its children and contains a unique 32-bit signature. Fnodes also contain the initial portion of the name of their file or directory. Consequently, SHODS can rebuild an entire volume by methodically scanning the disk for Fnodes, allocations sectors, and directory blocks, using them to reconstruct the files and directories and finally regenerating the freespace bitmaps.

As mentioned above, the present invention employs B+ trees and B− trees (binary trees) for logically ordering files and directories. Binary trees are a technique for imposing a logical ordering on a collection of data items by means of pointers, without regard to the physical order of the data.

Figure 5F:
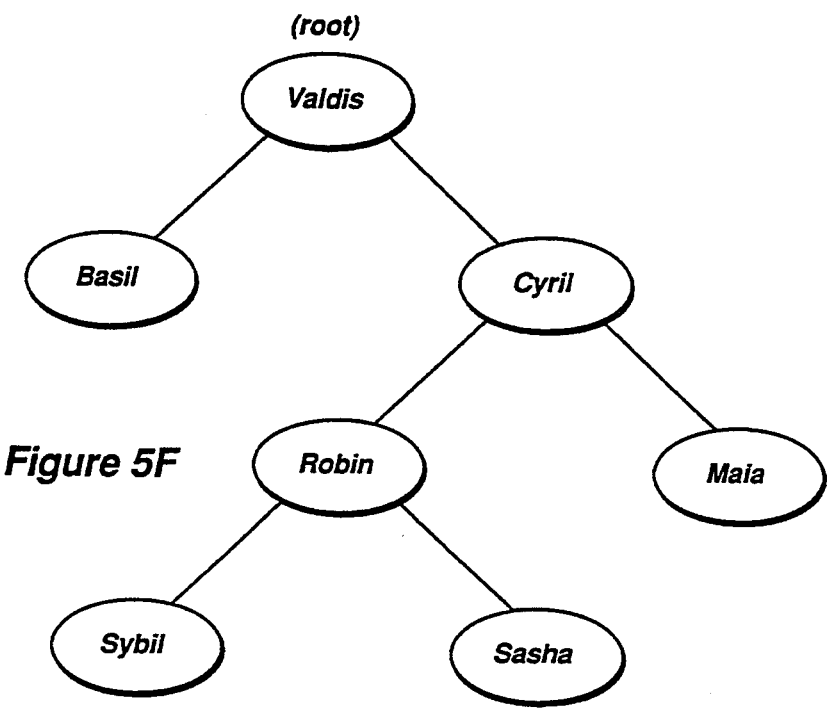

Referring now to FIGS. 5F, in a simple binary tree, each node contains some data, including a key value that determines the node's logical position in the tree, as well as pointers to the node's left and right subtrees. The node that begins the tree is known as the root; the nodes that sit at the ends of the tree's branches are sometime called the leaves.

To find a particular piece of data, the binary tree is traversed from the root. At each node, the desired key is compared with the node's key; if they don't match, one branch of the node's subtree or another is selected based on whether the desired key is less than or grater than the node's key. This process continues until a match is found or an empty subtree is encountered as shown in FIG. 5F.

Such simple binary trees, although easy to understand and implement, have disadvantages in practice. If keys are not well distributed or are added to the tree in a non-random fashion, the tree can become quite asymmetric, leading to wide variations in tree traversal time.

In order to make access times uniform, many programmers prefer a particular type of balanced tree known as a B− Tree as shown in FIG. 5. The important points about a B− Tree are that the data is stored in all nodes, more than one data item might be stored in a node, and all of the branches of the tree are of identical length.

The worst-case behavior of a B− Tree is predictable and much better than that of a simple binary tree, but the maintenance of a B− Tree is correspondingly more complex. Adding a new data item, changing a key value, or deleting a data item may result in the he splitting or merging of a node, which in turn forces a cascade of other operations on the tree to rebalance it.

Figure 5G:
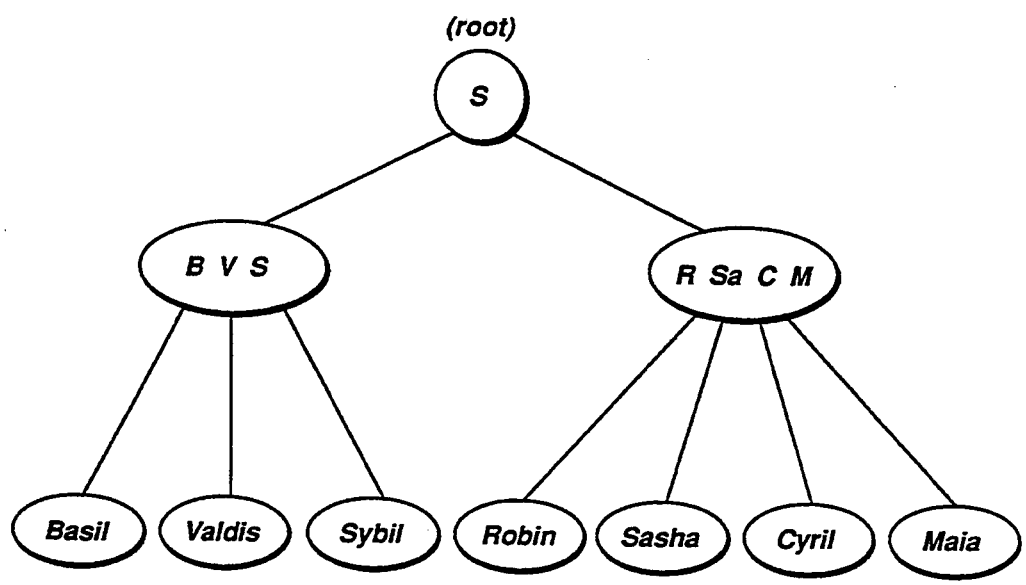
Figure 5H:
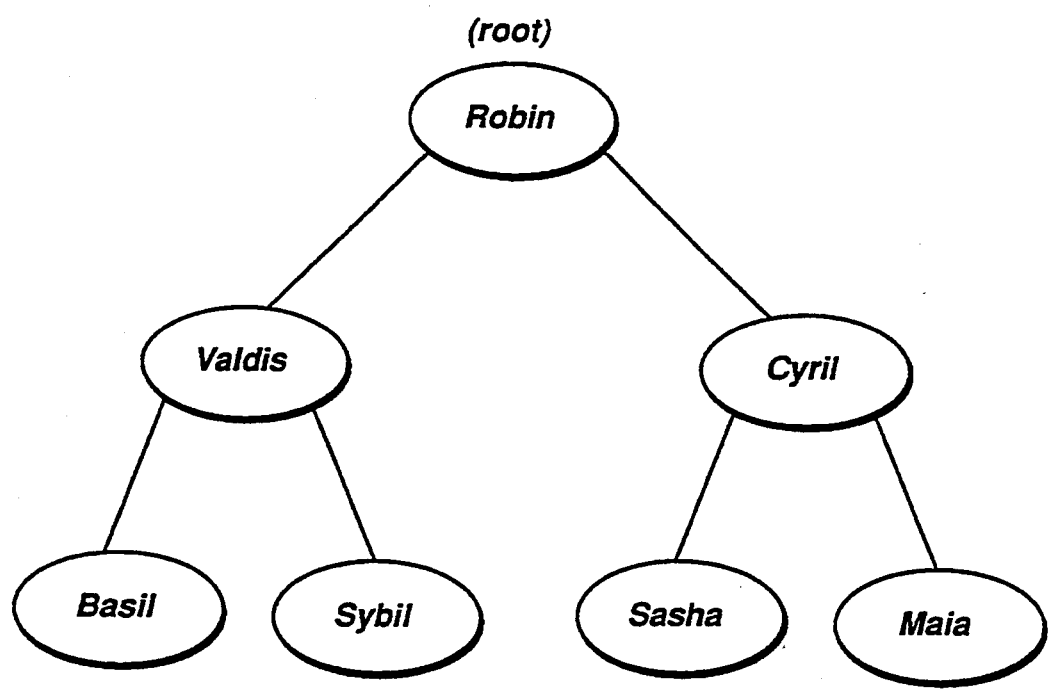

As shown in FIG. 5G, a B+ Tree is a specialized form of B− Tree that has two types of nodes: internal, which only point to other nodes, and external, which contain the actual data.

The advantage of a B+ Tree over a B− Tree is that the internal nodes of the B+ Tree can hold many more decision values than the intermediate-level nodes of a B− Tree, so the fan out of the tree is faster and the average length of a branch is shorter. This compensates for the fact that a B+ Tree branch must be followed to its end to find the necessary data, whereas in a B− Tree the data may be discovered at an intermediate node or even at the root.

The present invention comprises an improvement to the OS/2 operating system and may be implemented with many of the utilities and subroutines available in current versions of OS/2. While primarily intended for use with the OS/2 operating system, the principles of the present invention may be applied to virtually any computer operating system. With the exception of the new utilities and subroutines described herein, all other utilities and subroutines are currently available and well known. For a detailed description of the OS/2 operating system refer to the OS/2 Programmer's Reference texts described above. Volume Management in the improved OS/2 operating system of the present invention is responsible for the same duties it performed in previous versions of OS/2 such as detecting when the wrong volume is inserted in the drive, detecting when a volume has been removed, generating new information on new media that has been placed in the drive via the Volume Parameter Block (VPB), communicating with the appropriate device drivers, providing the system with device information needed to access new inserted media, interfacing with the Buffer and CDS mechanisms, and informing the system of changes to a specific volume.

In previous versions of OS/2, there was only one file system. The present invention provides for multiple file systems in a unified environment. The volume manager determines which file system should have access to a particular volume, provides mechanisms that will allow file system drivers (FSDs) to manage their resources for a particular volume, and provides the same support for all FSDs provided in the past for managing volumes. The present invention relies on existing well-known OS/2 calls as well as several new functions described herein. A complete description of the installable file system of the present invention is set forth in Appendix I which is attached hereto in the form of microfiche, which can be found in the application file, and is herein incorporated by reference.

The present invention contemplates the use of MOUNT and UNMOUNT processes to facilitate the identification and loading of the correct file system driver for individual volumes.

The MOUNT Process gets initiated by several different events:
1. The first access to a volume.
2. Whenever the volume in a drive becomes uncertain. (This usually means the user put a new medium in the drive.)
3. Whenever access to a volume that is not in the drive is requested.

Input to the MOUNT process is a pointer to a drive parameter block (DPB) which is used to do I/O to the device driver and to store the handle to the VPB for the volume currently believed to be in the drive. A mount operation updates this. A local VPB is allocated on a stack and initialized with the DPB pointer.

Figure 6:
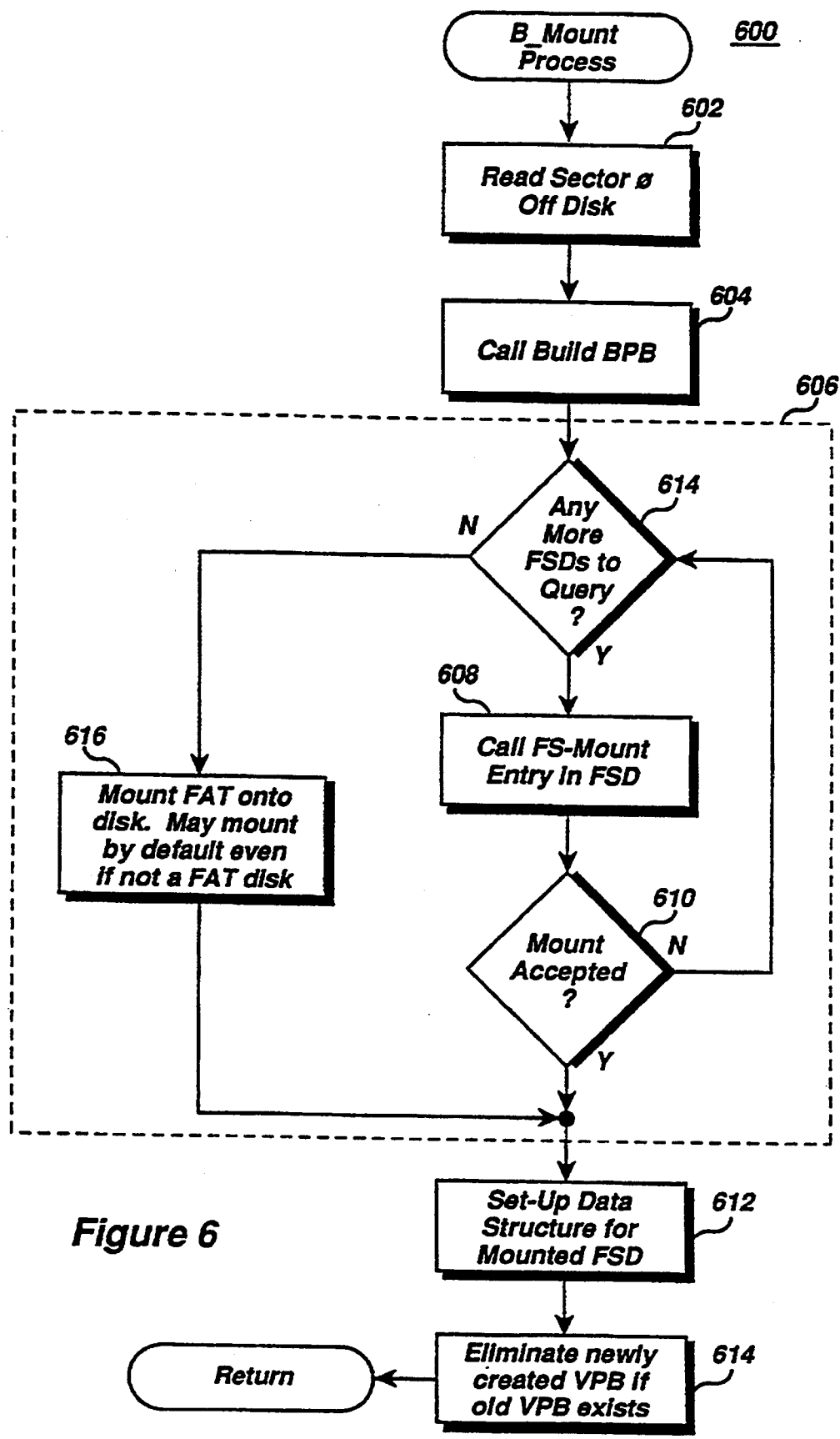
FIG. 6 is a flow diagram detailing the overall operation of the mount process of the present invention.

Referring now to FIG. 6, the MOUNT process 600 begins by reading logical sector 0 of the media as indicated by item 602. Any errors encountered from the device driver are ignored because it is possible that different types of media (i.e. Optical Disk or CD-ROM) may have track 0 unreadable. Before reading logical sector 0 the temporary mount buffer is initialized to zeros. The Volume label text field is initialized to "UN-LABELED". Sector 0 is checked to determine whether the format is recognized by comparing signature byte for a special value (41). If the format is not recognized, the information pertinent to the VPB is filled in on the stack (i.e. 32 Bit Volume Serial Number).

A BUILDBPB call is then issued by item 604 to the device driver specified in the DPB. BUILDBPB is a procedure exported by a device drivers. A detailed description of the BUILDBPB procedure is set forth in Appendix I. BUILDBPB is called to learn the physical parameters of the device (bytes per sector, sectors per track, and the like.) The device driver is passed a pointer to the buffer that contains information it can use to determine the physical parameters of the volume. For most drivers this is sector 0, for some very old ones it is the first sector of the FAT. If the device is not able to interpret the data read from Sector 0 (for example, the floppy in question is not FAT, so the FAT ID byte is meaningless) the device returns a minimal BPB, adequate to allow the kernel and FSDs to do necessary I/O to completely identify the volume.

The relevant fields from the previously created BPB are copied into the Local VPB on the stack (i.e. Sectors/track, NumberofHeads, Total Sectors, Sector Size). A new VPB is allocated and information from the Local VPB is copied into it. The present invention then enters loop 606 to poll each FSD by calling the FS_MOUNT (flag=0) entry point with the handle of newly created VPB, a pointer to logical sector 0, and pointers to VPB file system independent and dependent areas of the VPB as indicated by item 608. The FSD may call FSH_DoVolIO to read other sectors from the volume (It must allocate its own buffer). If the FSD returns ERROR_UNCERTAIN_MEDIA, the error is returned and the process is restarted as indicated by decision 610. If the FSD supports boot sectors, it may check the file system name field in the boot sector to determine whether it recognizes it. If the FSD does not support boot sectors I/O to the device is performed to determine if the FSD recognizes the volume. Once an FSD has recognized the volume it updates the relevant fields in the VPB file system independent and dependent areas as indicated by item 612. The VPB file system independent and dependent areas are discussed in more detail in conjunction with FIG. 7. At this time the FSD issues a FS Helper (FSH) function to determine whether the new volume is the same as any of the other volumes that the present invention manages. This FS Helper returns pointers to the file system independent and dependent areas. The FSD then copies information from the newly created VPB to old VPB as indicated by item 614. The newly created VPB is destroyed after the MOUNT call. The FSD then performs any cleanup work on the old VPB such as invalidating any buffers since the volume may have been removed from the drive.

Once an FSD has recognized the volume, the present invention eliminates the new VPB if a match is found in the list. Otherwise, the VPB is linked into a list of mounted FSDs. If no FSDs are recognized, the VPB is freed and the FAT file system is mounted as indicated by decision 614 and item 616.

When a new volume is inserted into a drive and the old volume has no more kernel references to the old volume the present invention issues a FS_MOUNT (flag=2) to the FSD so that resources allocated to that volume may be de-allocated.

When the present invention detects that a newly inserted volume is different than the last volume in the drive a FS_MOUNT (flag=1) call is issued to the FSD so that any cleanup type work such as buffer invalidation on the removed volume may be performed. If there are no more kernel references to the volume, a FS_MOUNT (flag=2, UNMOUNT) will follow. If the newly inserted volume is the same as the last seen volume in the drive, this call is not issued.

The present invention contemplates the use of an efficient mechanism to utilize existing kernel resources for functions required by an FSD. Specifically, if an FSD requires a function existing within the kernel, the FSD issues a file system helper (FSH) call which invokes the file system helper. The called FSH then returns the requested information. A brief summary of file system helpers is set forth below. While the summary set forth below lists several important file system helpers, it is contemplated that additional file system helpers will be provided as required. File system helpers are discussed in detail in Appendix I.

File System Helpers:

FSH_GETVOLPARM - On many FS calls, the handle to the VPB is passed to the FSD and it is often necessary for the FSD to access the file system independent and dependent areas of the VPB. This helper provides that service.

FSH_DOVOLIO - When an FSD needs to perform I/O to a specified volume it uses this helper to insure that the requested volume is indeed in the drive, to call the appropriate device driver and to handle hard errors. This helper may be used at all times within the FSD. When called within the scope of a FS_MOUNT call, it applies to the volume in the drive. However, since volume recognition is not complete until the FSD returns to the FS_MOUNT call, the FSD must take care when an ERROR_UNCERTAIN_MEDIA is returned. This indicates that the media has gone uncertain while trying to identify the media in the drive. This may indicate that the volume that the FSD was trying to recognize was removed. In this case, the FSD releases any resources attached to the hVPB passed in the FS_MOUNT call and ERROR_UNCERTAIN_MEDIA is returned to the FS_MOUNT call. This directs the volume tracking logic to restart the mount process.

FSH_DUPLICATEVPB - During a FS_MOUNT call the input VPB may be the same volume as one of the other volumes being managed. It is the responsibility of the FSD generate up-to-date information on the new volume and copy that information to the older duplicate VPB. This helper determines if an older duplicate VPB exists and if it does, pointers to the file system independent and dependent areas of the older duplicate VPB will be returned so that these areas can be updated by the FSD. The FSD then performs any cleanup work on the old volume since the volume may have been removed.

As mentioned above, the present invention contemplates the use of pre-existing OS/2 resources whenever possible. The listing below is a summary of the hierarchy of functions invoked during the operation of the present invention.

TABLE 1

| | |
|---|---|
| 1 | DoVolIO |
| 1.1 | WhatVolume |
| 1.1.1 | ProbeChange |
| 1.1.2 | ResetMedia |
| 1.1.3 | GenhVPB |
| 1.1.3.1 | LockVBuf |
| 1.1.3.2 | ReadBoot |
| 1.1.3.3 | BuildBPB |
| 1.1.3.4 | FSMountVolume |
| 1.1.3.4.1 | Bmp_Get |
| 1.1.3.4.2 | VPBCopy |
| 1.1.3.4.3 | VPBLink |
| 1.1.3.4.4 | VPBFind |
| 1.1.3.4.5 | VPBFree |
| 1.1.3.5 | SetVPB |
| 1.1.3.6 | FindVID |
| 1.1.3.7 | DiskIO |
| 1.1.3.8 | CRC |
| 1.1.3.9 | VPBFIND |
| 1.1.3.10 | Bmp_Get |
| 1.1.3.11 | VPBCopy |
| 1.1.3.12 | VPBLink |
| 1.1.3.13 | UnlockVBuf |
| 1.1.3.14 | BufInvalidate (Redetermine Media) |
| 1.1.3.15 | FlushBuf (Redetermine Media) |
| 1.1.4 | IncVPBRef |
| 1.1.5 | DecVPBRef |
| 1.1.5.1 | VPBFree |
| 1.1.6 | ResetCurrency |
| 1.1.6.1 | NextCDS |
| 1.1.6.2 | PointComp |
| 1.1.6.3 | BufInvalidate |

The present invention is invoked whenever media becomes uncertain or whenever media is first accessed. The volume management function of the present invention is represented by line 1. The initial process is to determine what volume has been presented to the system as indicated by line 1.1. In line 1.1.1, ProbeChange is called to access the device driver to determine if the device driver detected a change in media. If a change in media was detected, ResetMedia is invoked in line 1.1.2 to instruct the device driver to allow I/O to the media. GenhVPB is then invoked in line 1.1.3 to generate a volume parameter block. This process begins with line 1.1.3.1 where LockVBuf is called to clear and serialize a buffer in the operating system kernel. In line 1.1.3.2, the data in the media boot sector is read into the operating system buffer. The system proceeds to line 1.1.3.3 wherein BuildBPB is invoked to call the disk driver and build a boot parameter block. FS_Mount is then invoked in line 1.1.3.4. The first step in FS_Mount invokes Bmp_Get in line 1.1.3.4.1 which is a memory management utility in the kernel which is called to set-up a buffer for the BPB. In line 1.1.3.4, when FSMountVolume is called, it iterates through the list of FSDs, calling each FSD's FS_Mount procedure until one returns success or the end of the list is reached. If an FSD returns success, in line 1.1.3.4.2, VPBCopy is called to create a temporary buffer for a copy of the BPB. VPBLink is then called in line 1.1.3.4.3 to link the VPB into a chain and set-up the BPB to point to the next VPB in the chain and to initialize the current VPB to the beginning of the list. VPBFind is invoked in line

1.1.3.4.4 to examine the chain of VPBs to find a VPB which possesses the same volume identifier as the VPB being processed. If a duplicate VPB identifier is found, VPBfree is called in line 1.1.3.4.5 to free the VPB under examination from the BPB if a duplicate VPB is found in the list of VPBs. Once FSMountVolume is complete, SetVPB is invoked in line 1.1.3.5 which sets up the appropriate fields in the VPB. In line 1.1.3.6, FindVID is called to find the volume identifier. DiskIO is invoked in line 1.1.3.7 if no boot block is found in sector 0 of the media to locate the BPB for the volume. If no FSD's FS_Mount routine returned success, then inline code which is logically equivalent to the FS_Mount procedure for the (resident) FAT file system is called. In line 1.1.3.8 CRC is called to checksum the first directory of old FAT volumes, to generate a unique volume serial number for volume that do not have a serial number in their boot sectors. The functions listed in lines 1.1.3.9–1.1.3.13 are then invoked to generate a new volume identifier and free the volume identifier buffer. In line 1.1.2.14, BufInvalidate is invoked to invalidate all data in the buffer if the media has changed since the process began. If so, FlushBuf is called in line 1.1.3.15 to flush the buffers for the new media.

If a preexisting VPB for the volume was not found, IncVPBRef in line 1.1.4 is invoked to increment a reference counter for the current VPB which is used to record whether the volume of interest is still open to the operating system kernel. In line 1.1.5, DecVPBRef is invoked to decrement the reference counter for a previous VPB. If the reference counter is decremented to zero, VPBFree is invoked in line 1.1.5.1 to free the VPB. ResetCurrency is called in line 1.1.6 to mark position data in current directory structures as invalid. NextCDS (1.1.6.1) and PointComp (1.1.6.2) are internal routines used to enumerate current directory structures (CDSs). In line 1.1.6.3 BufInvalidate is called to remove (now stale) VPB references from a file system buffer pool.

As mentioned above, a VPB is used by the system to store information about a particular volume that is in use in the system. A volume is defined as a medium in a block device and the information on the medium differentiates it from every other volume.

VPBs are kept in a segment as BMP. Therefore, the system needs only track the records that are in use, and takes manages the free list.

Every time a new volume is encountered, i.e. a VPB built for a volume does not match any of the VPBs already in the system, a new entry is allocated in the BMP managed segment and is filled in with the relevant data from the medium. Every time the system is finished with a VPB, i.e. its refcount goes to zero, the entry in the BMP managed segment is freed, BMP tracks this freed storage for reuse. The structures used by the functions of Table I are set forth below.

Figure 7:
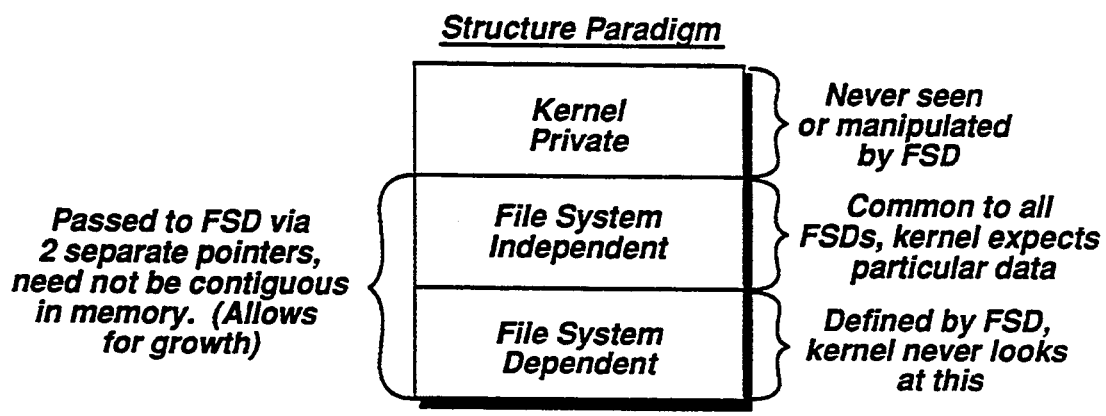
FIG. 7 is a diagram of the structure of the installable file system of the present invention.

A VPB is divided into three parts:
1. the kernel private part, used to keep information the kernel needs to manage the VPB (reference counts, for example). This is private to the kernel, meaning that FSDs never access or modify it.
2. the file system independent part, used by all file systems and independent of any particular file system. This is passed to an installable file system (IFS) for certain file system (FS) calls, and
3. a part that is specific to the file system that is using the VPB. This is set out as a "work area" that the file system can use as required. This is passed to the IFS for certain FS calls. The layout of the VPB is shown in FIG. 7.

The following structure defines the file system independent part of the VPB. This structure is used by all file systems irrespective of the type of file system.

| vpbfsi | STRUC | | |
|---|---|---|---|
| vpi_ID | DD | ? | ;32 bit unique ID of file |
| vpi_pDPB | DD | ? | ;Drive volume is in |
| vpi_cbSector | DW | ? | ;Size of physical sector in bytes |
| vpi_totsec | DD | ? | ;Total number of sectors on medium |
| vpi_trksec | DW | ? | ;Sectors per track on medium |
| vpi_nhead | DW | ? | ;Number of heads in device |
| vpi_text | DB | | VPBTEXTLEN DUP (?) ;printable ID for users |
| vpbfsi | ENDS | | |

The following structure defines the file system dependent pan of the VPB. This structure is used by file systems as they see fit.

| vpbfsd | STRUC | |
|---|---|---|
| vpd_work | DB | VPDWORKAREASIZE DUP (?) |
| vpbfsd | ENDS | |

The following structure defines the structure of the volume parameter block (VPB).

| vpb | STRUC | | |
|---|---|---|---|
| Fields used by kernel for all file systems | | | |
| vpb_flink | DW | ? | ;handle of forward link |
| vpb_blink | DW | ? | ;handle of back link |
| vpb_IDsector | DD | ? | ;sector number of ID |
| vpb_ref_count | DW | ? | ;count of objects that point to VPB |
| vpb_search_count | DW | ? | ;count of searches that point to VPB |
| vpb_first_access | DB | ? | ;This is initialized to −1 to force a media |
| vpb_signature | DW | ? | ;Signature which specifies VPB validity |
| vpb_flags | DB | ? | ;flags |
| vpb_FSC | DD | ? | ;Pointer to the file system control block (FSC). |

The following fields are used for file system dependent work.

| vpb_fsb | DB | SIZE vpbfsd DUP (?) |
|---|---|---|

The following fields are used for file system independent work.

| | | |
|---|---|---|
| vpb_fsi | DB | SIZE vpbfsi DUP (?) |
| vpb | ENDS | |

The following structure is used by FSH_GETVOLPARM - which is used to get VPB data from VPB handle.

| | | | |
|---|---|---|---|
| ; | | | |
| ENTRY | push | word hVPB | (1 word) |
| | push | dword ptr to file system ind. | (2 word) |
| | push | dword ptr to file system dep. | (2 word) |
| | call | FSHGETVOLPARM | |
| EXIT (ax) = return code | | | |
| 0 - success | | | |

The following structure is used by FSH_DOVOLIO - which is used for volume-based sector-oriented transfers.

| | | | |
|---|---|---|---|
| ENTRY | push | word Operation | (1 word) |
| | push | word hVPB | (1 word) |
| | push | dword ptr to user transfer area | (2 word) |
| | push | dword ptr to sector count | (2 word) |
| | push | dword starting sector number | (2 word) |
| | call | FSHDOVOLIO | |
| EXIT (ax) = return code | | | |
| 0 - success | | | |

The following structure is used by FSH_DUPLICATEVPB - which is used to get VPB data to a duplicate (old) VPB.

| | | | |
|---|---|---|---|
| ENTRY | push | word hVPB | (1 word) |
| | push | dword ptr to file system ind. | (2 word) |
| | push | dword ptr to file system dep. | (2 word) |
| | call | FSHGETVOLPARM | |
| ; | | | |
| EXIT (ax) = return code | | | |
| 0 - success | | | |

RedetermineMedia has a special set of entry parameters, as shown, below.

| | |
|---|---|
| ENTRY (DS;SI) point to dpb | |
| EXIT | Carry clear => |
| | (DS;SI).hVPB is filled in with the "correct" volume |
| | Carry Set => |
| | (AX) = I/O packet status; operation was failed |
| USES | AX, BX, DX, DI, ES, Flags |

The following calls are used for volume management intra-component interfaces.

GenhVPB is used to determine the internal VPB in a particular drive. Any errors returned are sent to the user.

| | |
|---|---|
| Inputs; | ds;si point to DPB of interest. It and whatever volume was in it last are locked. |
| Outputs; | Carry clear => ax is handle to VPB for drive |
| | Carry set => operation generated an error |
| | zero clear => operation was failed |
| | zero set => nested uncertain media occurred |
| ; | |
| All registers may be modified | |

BuildBPB is called to generate a valid BPB for an old disk; one that does not have a recognized boot sector. The newer disks have a KNOWN and VALID BPB in the boot sector. The buffer to the device driver is part of the BuildBPB call.

| | |
|---|---|
| Inputs; | ds;si point to DPB of interest |
| | pVPBBuf is locked |
| Outputs; | carry clear => |
| | ds;si points to a BPB |
| | carry set => |
| | (AX) = status word from device |
| | zero set => nested uncertain media error |
| | zero reset => operation was failed |
| All registers modified all except BP | |

FSMountVolume checks to determine whether an IFS Driver recognizes the Volume of interest.

FSMountVolume Loops through the FSD chain calling each FS Driver FS_Mount entry point to determine whether the IFS recognizes the volume of interest. The loop terminatea when the first IFS recognizes the volume or when the loop counter for the number of FS Drivers installed in the system decrements to 0.

| | |
|---|---|
| ; | |
| Inputs; | ds;bx point to pVPBBuf boot sector |
| | di offset of LocalVPB on Stack |
| Outputs; | di = offset to FSC if an IFS recognized the volume. |
| | di = −1 if no IFS driver recognized the volume |
| | ax = vpb handle |
| Registers modified: ax,bp,bx,di,es,si,ds | |

VPBFree removes the VPB from the link list and Frees its block from the segment.

| | |
|---|---|
| ENTRY | (BP) = handle to VPB |
| EXIT | VPB unlinked and Freed |
| USES | bx,bp,cx,di,ds,es |

VPBLink inserts the new VPB at the beginning of the list and adjusts the forward and backlink fields of new VPB and the old first VPB.

| | |
|---|---|
| ENTRY | ES;DI = New VPB |
| EXIT | VPB Linked into list. |
| USES | DS,SI |

VPBFind scans the internal list looking for a VPB with the same Vol. ID as the input VPB.

| | |
|---|---|
| ENTRY | DS;SI = Pointer to input VPB Vol. ID |
| EXIT | AX = hVPB if found |
| | AX = 0 if not found |
| USES | AX,BX,CX,DI,DS,ES |

VPBCopy copies a VPB from the local area to the BMP managed area and stamps VPB as valid.

| ENTRY | SI = Offset of Local VPB on Stack ES;DI —> New VPB |
|---|---|
| EXIT | None |
| USES | AX,CX,DS,SI |

Volume management, i.e., detecting when the wrong volume is mounted and notifying the operator to take corrective action, is handled directly through the operating system kernel and the appropriate device driver. According to the principles of the present invention, each file system driver (FSD) generates a volume label and 32-bit volume serial number for each volume used with the system. Preferably, these are stored in a reserved location in logical sector zero when a volume is formatted. No particular format is required to store this information. The operating system kernel calls the FSD to perform operations that might involve it. The FSD updates the volume parameter block (VPB) whenever the volume label or serial number is changed.

When the FSD passes an I/O request to an FS helper routine the device driver passes the 32-bit volume serial number and the volume label (via the VPB). When the I/O is performed on a volume, The operating system kernel compares the requested volume serial number with the current volume serial number it maintains for the device. This is an in-storage test (no I/O required) performed by checking the Drive Parameter Block's (DPB) VPB of volume mounted in the drive. If unequal, The operating system kernel signals the critical error handler to prompt the user to insert the volume having the serial number and label specified.

When a media change is detected a drive, or the first time a drive is accessed on behalf of an application program interface (API) function call, the present invention determines the FSD (file system driver) that will be responsible for managing I/O to that volume. The present invention then allocates a VPB (volume parameter block) and polls the installed FSDs an FSD indicates that it does recognize the media. The FSDs are polled as described above.

The FAT FSD is the last in the list of FSDs and, by recognizing all media, will act as the default FSD when no other FSD recognition takes place.

According to the principles of the present invention, there are two classes of file system drivers:
1. an FSD which uses a block device driver to do I/O to a local or remote (virtual disk) device. (This is referred to as a local file system), and
2. an FSD which accesses a remote system without a block device driver This is called a remote file system.

The connection between a drive letter and a remote file system is achieved through a programmatic interface. The DosFSAttach system call is used to create a binding between an object in the system name space (e.g. A drive) and an FSD.

The connection between a pseudo-character device and a remote file system is also achieved through the DosFsAttach interface. The DosFsAttach interfaces comprises the DosFsAttach and DosQFsAttach calls which are described in detail in Appendix I.

When a local volume is first referenced, the present invention sequentially asks each local FSD in the FSD chain to accept the media, via a call to each FSD's FS_MOUNT entry point. If no FSD accepts the media then it is assigned to the default FAT file system. Any further attempt made to access an unrecognized media other than by FORMAT, results in an 'IN-VALID_MEDIA_FORMAT' error message.

Once a volume has been recognized, the relationship between drive, FSD, volume serial number, and volume label is stored. The volume serial number and label are stored in the volume parameter block, (VPB). The VPB is maintained by the operating system for open files (file-handle based I/O), searches, and buffer references.

Subsequent requests for a removed volume require polling the installed FSDs for volume recognition by calling FS_MOUNT. The volume serial number and volume label of the VPB returned by the recognizing FSD and the existing VPB are compared. If the test succeeds, the FSD is given access to the volume. If the test fails, the operating system signals the critical error handler to prompt the user for the correct volume.

The connection between media and VPB is saved until all open files on the volume are closed, search references and cache buffer references are removed. Only volume changes cause a re-determination of the media at the time of next access.

Access to an operating system partition on a bootable, logically partitioned media is through the full operating system function set such as the function set available with the OS/2 operating system. A detailed description of disk partitioning design is available in the OS/2 Programmer's Reference texts described above.

The present invention provides the DosQFsAttach function to identify remote devices which communicate with the operating system through a network. The purpose of DosQFsAttach is to query information about an attached remote file system, a local file system, about a character device, or about pseudo-character device name attached to a local or remote FSD.

The sequence for calling DosQFsAttach is as follows:

| EXTRN DosQFsAttach:FAR | | |
|---|---|---|
| PUSH ASCIIZ | DeviceName | ;Device name or 'd:' |
| PUSH WORD | Ordinal | ;Ordinal of entry in name list |
| PUSH WORD | FSAInfoLevel | ;Type of attached FSD data required |
| PUSH OTHER | DataBuffer | ;Returned data buffer |
| PUSH WORD | DataBufferLen | ;Buffer length |
| PUSH DWORD | 0 | ;Reserved (must be zero) |
| CALL DosQFsAttach | | |

Where:

DeviceName points to the drive letter followed by a colon, or points to a character or pseudo-character device name, or is ignored for some values of FSAInfoLevel. If DeviceName is a drive, it is an ASCIIZ string having the form of drive letter followed by a colon. If DeviceName is a character or pseudo-character device name, its format is that of an ASCIIZ string in the format of a filename in a subdirectory called which is preferably designated /DEV/.

Ordinal is an index into the list of character or pseudo-character devices, or the set of drives. Ordinal always starts at 1. The Ordinal position of an item in a list has no significance. Ordinal is used strictly to step through the list. The mapping from Ordinal to item is volatile, and may change from one call to DosQFsAttach to the next.

FSAInfoLevel is the level of information required, and determines which item the data in DataBuffer refers to.

Level 0x0001 returns data for the specific drive or device name referred to by DeviceName. The Ordinal field is Ignored.

Level 0x0002 returns data for the entry in the list of character or pseudocharacter devices selected by Ordinal. The DeviceName field is Ignored.

Level 0x0003 returns data for the entry in the list of drives selected by Ordinal. The DeviceName field is ignored.

DataBuffer is the return information buffer, it is in the following format:

```
struct {
    unsigned short iType;
    unsigned short cbName;
    unsigned char szName[];
    unsigned short cbFSDName;
    unsigned char szFSDName[];
    unsigned short cbFSAData;
    unsigned char rgFSAData[];
};
``` iType    type of item
1 = Resident character device
2 = Pseudo-character device
3 = Local drive
4 = Remote drive attached to FSD
cbName       Length of item name, not counting null.
szName       Item name, ASCIIZ string.
cbFSD Name   Length of FSD name, not counting null.
szFSDName    Name of FSD item is attached to, ASCIIZ string.
cbFSAData    Length of FSD Attach data returned by FSD.
rgFSAData    FSD Attach data returned by FSD.

szFSDName is the FSD name exported by the FSD, which is not necessarily the same as the FSD name in the boot sector.

For local character devices (iType=1), cbFSDName=0 and szFSDName will contain only a terminating NULL byte, and cbFSAData=0.

For local drives (iType=3), szFSDName will contain the name of the FSD attached to the drive at the time of the call. This information changes dynamically. If the drive is attached to the operating system kernel's resident file system, szFSDName will contain "FAT" or "UNKNOWN". Since the resident file system gets attached to any disk that other FSDs refuse to MOUNT, it is possible to have a disk that does not contain a recognizable file system, but yet gets attached to the resident file system. In this case, it is possible to detect the difference, and this information helps programs in not destroying data on a disk that was not properly recognized.

DataBufferLen is the byte length of the return buffer. Upon return, it is the length of the data returned in DataBuffer by the FSD.

Returns: IF ERROR(AX not=0)
AX=ErrorCode:

ERROR_INVALID_DRIVE - the drive specified is invalid
ERROR_BUFFER_OVERFLOW - the specified buffer is too short for the returned data.
ERROR_NO_MORE_ITEMS - the Ordinal specified refers to an item not in the list.
ERROR_INVALID_LEVEL - invalid info level Information about all block devices and all character and pseudo-character devices is returned by DosQFsAttach. The information returned by this call is highly volatile.

Preferably, calling programs should be aware that the returned information may have already changed by the time it's returned to them. The information returned for disks that are attached to the kernel's resident file system can be used to determine if the kernel definitely recognized the disk as one with its file system on it, or if the kernel just attached its file system to it because no other FSDs mounted the disk.

The set of error codes for errors general to all FSDs is 0xEE00 - 0xEEFF. The following errors have been defined although others may be added as needed:
ERROR_VOLUME_NOT_MOUNTED=0x-EE00 - The FSD did not recognize the volume.

The set of error codes which are defined by each FSD are 0xEF00 - 0xFEFF.

Disk media and file system layout are described by the following structures. The data which are provided to the file system may depend on the level of file system support provided by the device driver attached to the block device. These structures are relevant only for local file systems.

```
/*file system independent - volume params*/
struct vpfsi {
    unsigned long vpi_vid;      /*32 bit volume ID*/
    unsigned long vpi_hDEV;     /*handle to device driver*/
    unsigned short vpi_bsize;   /*sector size in bytes*/
    unsigned long vpi_totsec;   /*total number of sectors*/
    unsigned short vpi_trksec;  /*sectors/track*/
    unsigned short vpi_nhead;   /*number of heads*/
    char vpi_text[12];          /*asciiz volume name*/
};  /*vpfsi*/
/*file system dependent - volume params*/
struck vpfsd{
    char vpd_work[36]; /*work area*/
};   /*vpfsd*/
```

As mentioned above, the FS_MOUNT function is called to mount and unmount volumes and its purpose is to examine volumes to determine whether an FSD it recognizes the file system format. The sequence for calling FS_Mount is as follows:
int far pascal FS_MOUNT (flag, pvpfsi, pvpfsd, hVPB, pBoot)
unsigned short flag;
struct vpfsi far * pvpfsi;
struct vpfsd far * pvpfsd;
unsigned short hVPB;
char far * pBoot;
Where:
flag indicates operation requested.
flag=0 indicates that the FSD is requested to mount or accept a volume.
flag=1 indicates that the FSD is being advised that the specified volume has been removed.
flag=2 indicates that the FSD is requested to release all internal storage assigned to that volume as it has been removed from its drive and the last kernel-managed reference to that volume has been removed.

flag=3 indicates that the FSD is requested to accept the volume regardless of recognition in preparation for formatting for use with the FSD.

All other values are reserved. The value passed to the FSD will be valid.

pvpfsi - A pointer to file-system-independent portion of VPB. If the media contains an operating system-recognizable boot sector, then the vpi_vid field contains the 32-bit Identifier for that volume. If the media does not contain such a boot sector, the FSD generates a unique label for the media and places it into the vpi_vid field.

pvpfsd - pointer to file-system-dependent portion of VPB. The FSD may store information as necessary into this area.

hVPB - handle to volume.

pBoot - pointer to sector 0 read from the media. This pointer is ONLY valid when flag==0. The buffer the pointer refers to MUST NOT BE MODIFIED. The pointer is always valid and does not need to be verified when flag==0; if a read error occurred, the buffer will contain zeroes.

The FSD examines the volume presented and determines whether it recognizes the file system. If so, it returns zero after having filled in appropriate parts of vpfsi and vpfsd. The vpi_vid and vpi_text fields are filled in by the FSD. If the FSD has an operating system format boot sector, it converts the label from the media into asciiz form. The vpi_hDev field is filled in by the operating system. If the volume is unrecognized, the driver returns non-zero.

The vpi_text and vpi_vid are updated by the FSD each time these values change.

The contents of the vpfsd are as follows:

FLAG=0

The FSD issues an FSD_FINDDUPHVPB to determine whether a duplicate VPB exists. If one exists the VPB fs dependent area of the new VPB is invalid and the new VPB is unmounted after the FSD returns from the FS_MOUNT call. The FSD updates the fs dependent area of the old duplicate VPB.

If no duplicate VPB exists the FSD initializes the fs dependent area.

FLAG=1

VPB fs dependent part is same as when FSD last modified it.

FLAG=2

VPB fs dependent part is same as when FSD last modified it.

After media the recognition process, the volume parameters may be examined using the FSH_GETVOLPARM call. The volume parameters should not be changed after the media recognition process.

During a mount request, the FSD may examine other sectors on the media by using FSH_DOVOLIO to perform the I/O. If an uncertain-media return is detected, the FSD is "cleans up" and returns ERROR_UNCERTAIN_MEDIA to allow the volume mount logic to restart on the newly-inserted media. The FSD provides the buffer to use for additional I/O.

The operating system kernel manages the VPB via the refcount counter mentioned above. All volume-specific objects are labelled with the appropriate volume handle and represent references to the VPB. When all kernel references to a volume disappear, FS_MOUNT is called with flag=2, indicating a dismount request.

When the kernel detects that a volume has been removed from its drive, but there are still outstanding references to the volume, FS_MOUNT is called with flag=1 to allow the FSD to store clean (or other regenerable) data for the volume. Data which is dirty and cannot be regenerated is retained so that the data may be written to the volume when it is remounted in the drive. For the purposes of the present invention, clean data is data which is unchanged and dirty data is data which has been modified.

When a volume is to be formatted for use with an FSD, the operating system kernel calls the FSD's FS_MOUNT entry with flag=3 to allow the FSD to prepare for a format operation. The FSD accepts the volume even if it is not a volume of the type that FSD recognizes, since format changes the file system on the volume. The operation may be failed if formatting cannot be completed. (For example, an FSD which supports only CD-ROM.)

Since most computer system hardware does not allow for kernel-mediated removal of media, it is certain that the unmount request is issued when a volume is not present in any drive.

FSH_DOVOLIO performs I/O to a specified volume. FSH_DOVOLIO formats a device driver request packet for the requested I/O, locks the data transfer region, calls the device driver, and reports any errors to the hard error daemon before returning to the FSD. Any retries indicated by the hard error daemon or actions indicated by DOSERROR are done within the call to FSH_DOVOLIO.

The following describes the calling format for FSH_DOVOLIO.

int far pascal FSH_DOVOLIO (operation, hVPB, pData, pcSec, iSec)
unsigned short operation;
unsigned short hVPB;
char far * pData;
unsigned short far * pcSec;
unsigned long iSec;

Where:

The operation bit mask indicates read/read-bypass/write/write-bypass/verify-after-write/write-through and no-cache operation to be performed.

Bit 0x0001 off indicates read.
Bit 0x0001 on Indicates write.
Bit 0x0002 off indicates no bypass.
Bit 0x0002 on indicates cache bypass.
Bit 0x0004 off indicates no verify-after-write operation.
Bit 0x0004 on indicates verify-after-write.
Bit 0x0008 off indicates errors signalled to the hard error daemon.
Bit 0x0008 on indicates hard errors will be returned directly.
Bit 0x0010 off indicates I/O is not "write-through".
Bit 0x0010 on indicates I/O is "write-through".
Bit 0x0020 off indicates data for this I/O should be cached.
Bit 0x0020 on indicates data for this I/O should not be cached.

All other bits are reserved are zero.

The difference between the "cache bypass" and the "no cache" bits is in the type of request packet that the device driver will is passed. With "cache bypass", it will get a packet with command code 24, 25, or 26. With "no cache", the system gets the extended packets for command codes 4, 8, or 9.
  hVPB volume handle for source of I/O
  pData long address of user transfer area
  pcSec pointer to number of sectors to be transferred. On return this is the number of sectors successfully transferred.
  iSec sector number of first sector of transfer
  Returns Error code if operation failed, 0 otherwise.
  ERROR_PROTECTION_VIOLATION - the supplied address/length is not valid.
  ERROR_UNCERTAIN_MEDIA - the device driver can no longer reliably tell if the media has been changed. This occurs only within the context of an FS_MOUNT call.
  ERROR_TRANSFER_TOO_LONG - transfer is too long for device FSH_DOVOLIO may be used at all times within an FSD. When called within the scope of a FS_MOUNT call, it applies to the volume in the drive without regard to which volume it may be. However, since volume recognition is not complete until the FSD returns to the FS_MOUNT call, the FSD must take special precautions when an ERROR_UNCERTAIN_MEDIA is returned. This indicates that the media has gone uncertain trying to identify the media in a drive. This may indicate that the volume that the FSD was trying to recognize was removed. In this case, an FSD releases any resources attached to the hVPB passed in the FS_MOUNT call and returns ERROR_UNCERTAIN_MEDIA to the FS MOUNT call. This will direct the volume tracking logic to restart the mount process.

FSDs call FSH_DOVOLIO2 to control device driver operation independently from I/O operations. This routine supports volume management for IOCTL operations. Any errors are reported to the hard error daemon before returning to the FSD. Any retries indicated by the hard error daemon or actions indicated by DOSERROR are done within the call to FSH_DOVOLIO2.
  int far pascal FSH DOVOLIO2 (hDev, sfn, cat, func, pParm, cbParm, pData, cbData)
  unsigned long hDev;
  unsigned short sfn;
  unsigned short cat;
  unsigned short func;
  char far * pParm;
  unsigned short cbParm;
  char far * pData;
  unsigned short cbData;
Where:

| | |
|---|---|
| hDev | device handle obtained from VPB |
| sfn | system file number from open instance that caused the FSH_DEVIOCTL call. This field should be passed unchanged from the sfi_selfsfn field. If no open instance corresponds to this call, this field is set to 0xFFFF. |
| cat | category of IOCTL to perform |
| func | function within category of IOCTL |
| pParm | long address to parameter area |
| cbParm | length of parameter area |
| pData | long address to data area |
| cbData | length of data area |

Returns Error code if error detected, 0 otherwise.
The ERROR_INVALID_FUNCTION is invoked when a function supplied is incompatible with the system of the present mention. It allocates a new VPB whenever the media becomes uncertain (the device driver recognizes that it can no longer be certain that the media is unchanged). This VPB cannot be collapsed with a previously allocated VPB (due to a reinsertion of media) until the FS_MOUNT call returns. However, the previous VPB may have some cached data that must be updated from the media (the media may have been written while it was removed). FSH_FINDDUPHVPB allows the FSD to find this previous occurrence of the volume in order to update the cached information for the old VPB. The newly created VPB is unmounted if there is another, older VPB for that volume.

The calling format for FSH_FINDDUPHVPB is as follows.
  int far pascal FSH_FINDUPHVPB (hVPB, phVPB)
  unsigned short hVPB;
  unsigned short far * phVPB;
Where:

| | |
|---|---|
| hVPB | handle to the volume to be found |
| phVPB | pointer to where handle of matching volume will be stored. |

Returns Error code if no matching VPB found, 0 otherwise.
  ERROR_NO_ITEMS - there is no matching hVPB.
FSH_GETVOLPARM allows an FSD to retrieve file-system-independent and -dependent data from a VPB. Since the FS router passes in a VPB handle, individual FSDs map the handle into pointers to the relevant portions. The calling sequence for FSH_GETVOLPARM is as follows:
  void far pascal FSH GETVOLPARM (hVPB, ppVPBfsi, ppVPBfsd)
  unsigned short hVPB;
  struct vpfsi far * far * ppVPBfsi;
  struct vpfsd far * far * ppVPBfsd;
Where:

| | |
|---|---|
| hVPB | volume handle of interest |
| ppVPBfsi | location of where pointer to file-system- independent data is stored |
| ppVPBfsd | location of where pointer to file-system- dependent data is stored |

Returns: Nothing
Because FSD-Volume mapping is dynamic, and FSD-DD connections are achieved through the operating system kernel in an FSD and DD independent way, any FSD may access any volume, including volumes whose DDs where loaded from that FSD. Since a volume maps to a particular piece of removeable media or to any partition on any partitionable media, it is contemplated that multiple FSDs may have access to a particular hard disk or other media.

Volume file operations are divided into two categories: Named-based operations and handle-based operations. Name-based operations are typically initiated by a user wherein a user instructs the system 100 to perform a named operation on a file. Handle-based operations are typically initiated during the background operation of the system. Handle-based operations are usually preceded by a name-based operation.

Figure 8:
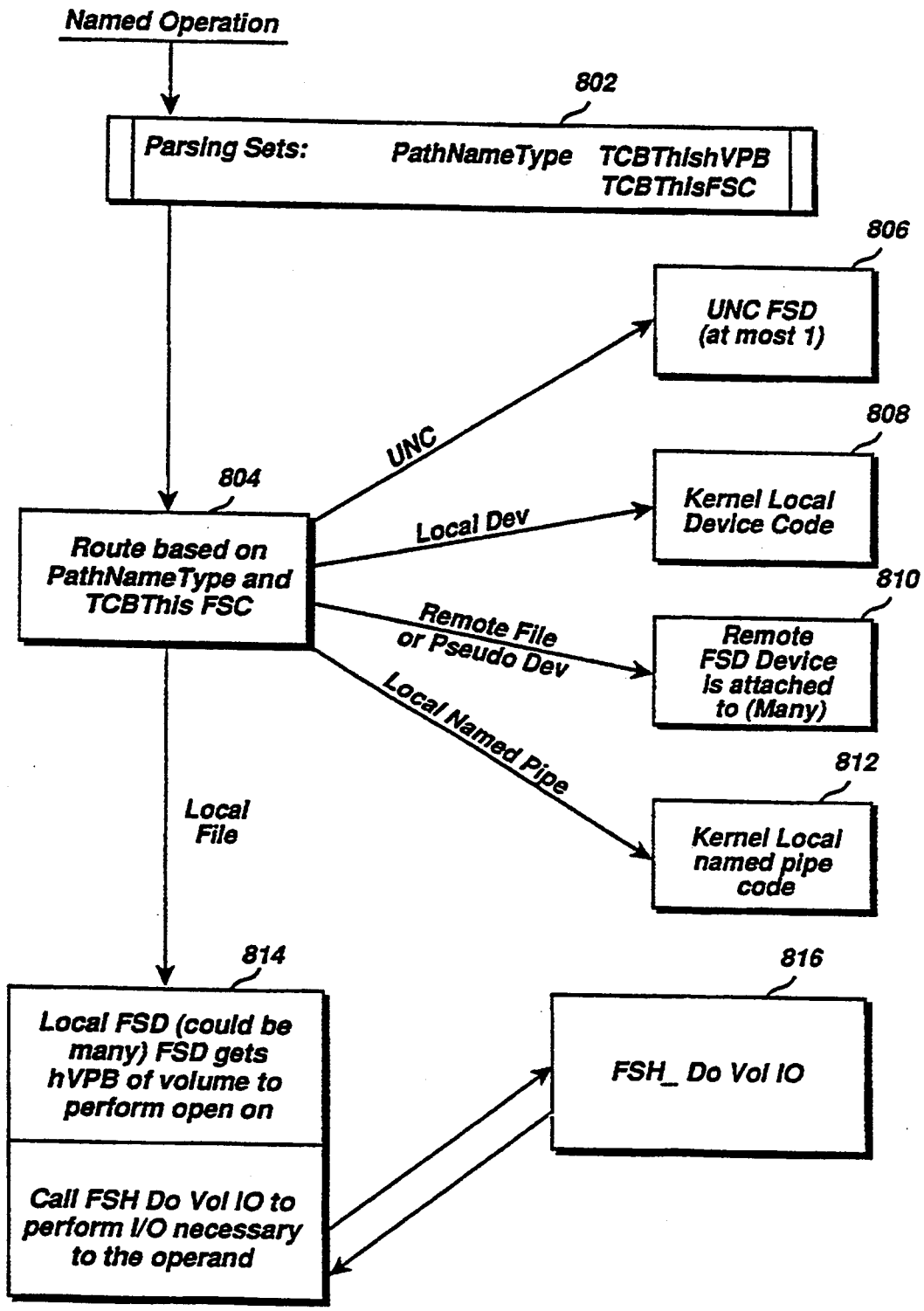
FIG. 8 is a flow diagram detailing the execution of name-based operations in accordance with the principles of the present invention.

Referring now to FIG. 8, the routine 800 is invoked when the system 100 performs named-based operations. A named operation is an operation which is directed by a character name, i.e. the operation is specified with the name of a file or directory. "Open file 'xxx'" is one example of a name-based operation. Process 802 is invoked to parse the name and return three variables: PathNameType; TCBThishVPB and TCBThisFSC. Process 802 is discussed in detail in conjunction with FIG. 9. (Note: h denotes a handle and TCB refers to a thread control block wherein TCHThishVPB is handle to the VPB currently of interest and TCBThisFCH is the pointer to the file system of interest). Item 804 then routes control to the appropriate function based on the variables PathType, TchThishVPB and TCBThisFCH returned by process 802. Control is passed item 806 if the path began with "//" indicating a Universal Naming Convention (UNC) global network name in which the UNC FSD is invoked. If a local device is indicated, control passes to item 808 to process the request within the kernel. If a pseudodevice or remote file is indicated, control passes to item 810 to route the request to the remote FSD to which the pseudodevice or remote file is attached. If a named pipe is detected, control passes to item 812 to call the local named pipe code within the kernel. If a local file is indicated, control passes to item 814 which is the FSD worker in the FSD which performs reads and writes to the volume by calling FSHDOVOLIO in item 816. FSHDOVOLIO is discussed further in conjunction with FIG. 11.

Figure 9:
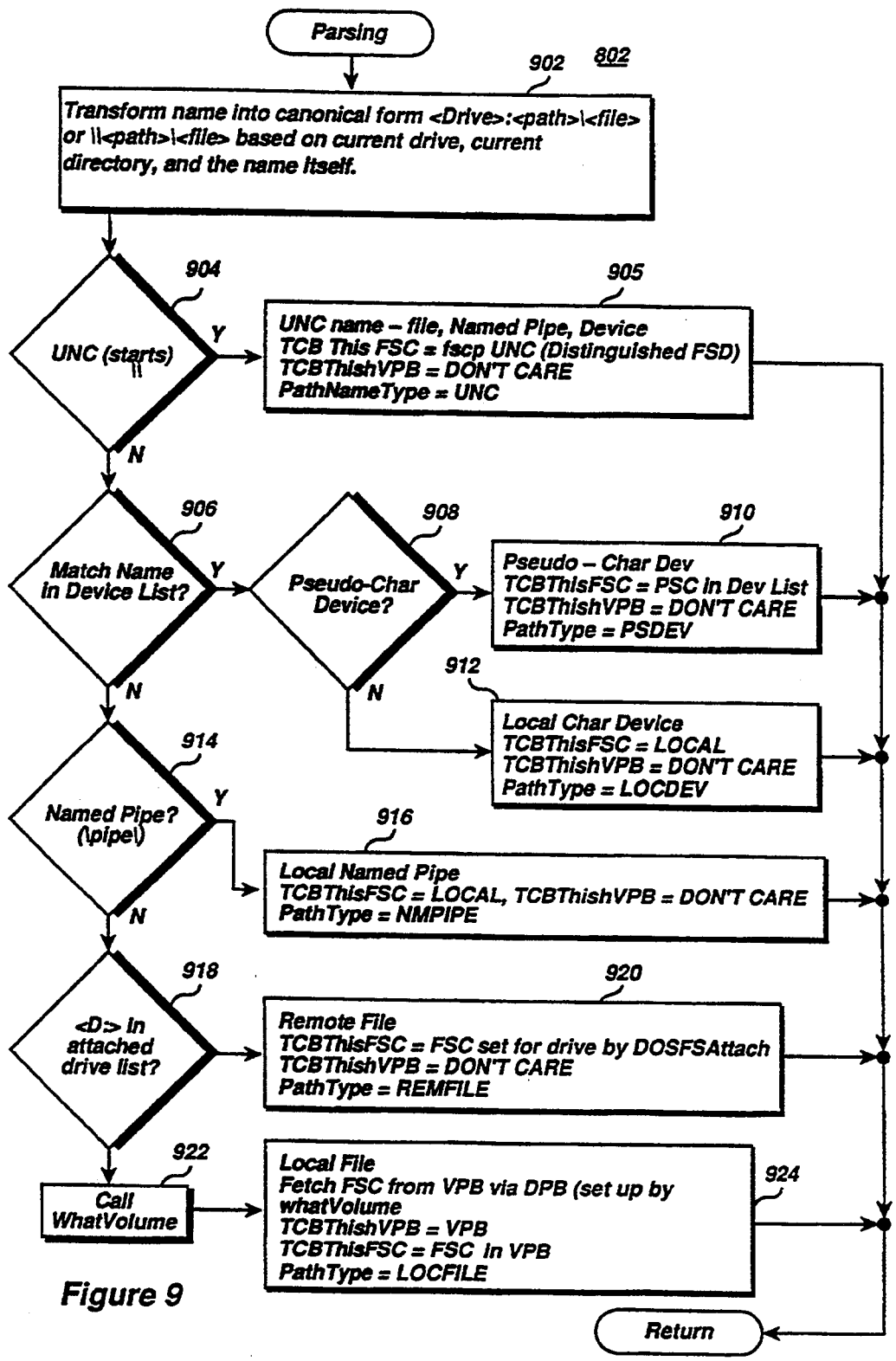
FIG. 9 is a flow diagram of the parsing process invoked by the named-based operations process.

Referring mow to FIG. 9, the parsing process 802 is described. When invoked, item 902 transforms the name of interest to a cannoical form based on current drive, current directory and the name itself. The variables TCBTHISFSC and TCHThisVPB and pathnametype are then determined as follows. Decision 904 determines whether the user name begins with "//" to determine whether a UNC name is indicated. If so, control passes to item 905, wherein the values of the variables PathType, TchThishVPB and TCBThisFCH are initialized to route the user name to the appropriate location. If not, decision 906 determines whether the name of interest is a name in the device name list maintained by the kernel. If so, decision 908 determines whether it is a pseudo-character device. If so, item 910 sets the variables as indicated. If not, control passes to item 912 which sets the variables as indicated.

Decision 914 determines whether the name represents a named pipe by looking for "/pipe/" at the beginning of the name. If so, item 916 set the variables as indicated. If not, decision 918 determines whether the name indicates a pathname on a local or remote drive. If a remote drive is indicated, control passes to item 920 which sets the variables PathType, TchThishVPB and TCBThisFCH as indicated. Otherwise, control passes to item 922 which calls what volume to read the appropriate data from the volume. When WhatVolume returns, control passes to item 924 which sets the variables PathType, TchThishVPB and TCBThisFCH as indicated.

Figure 10:
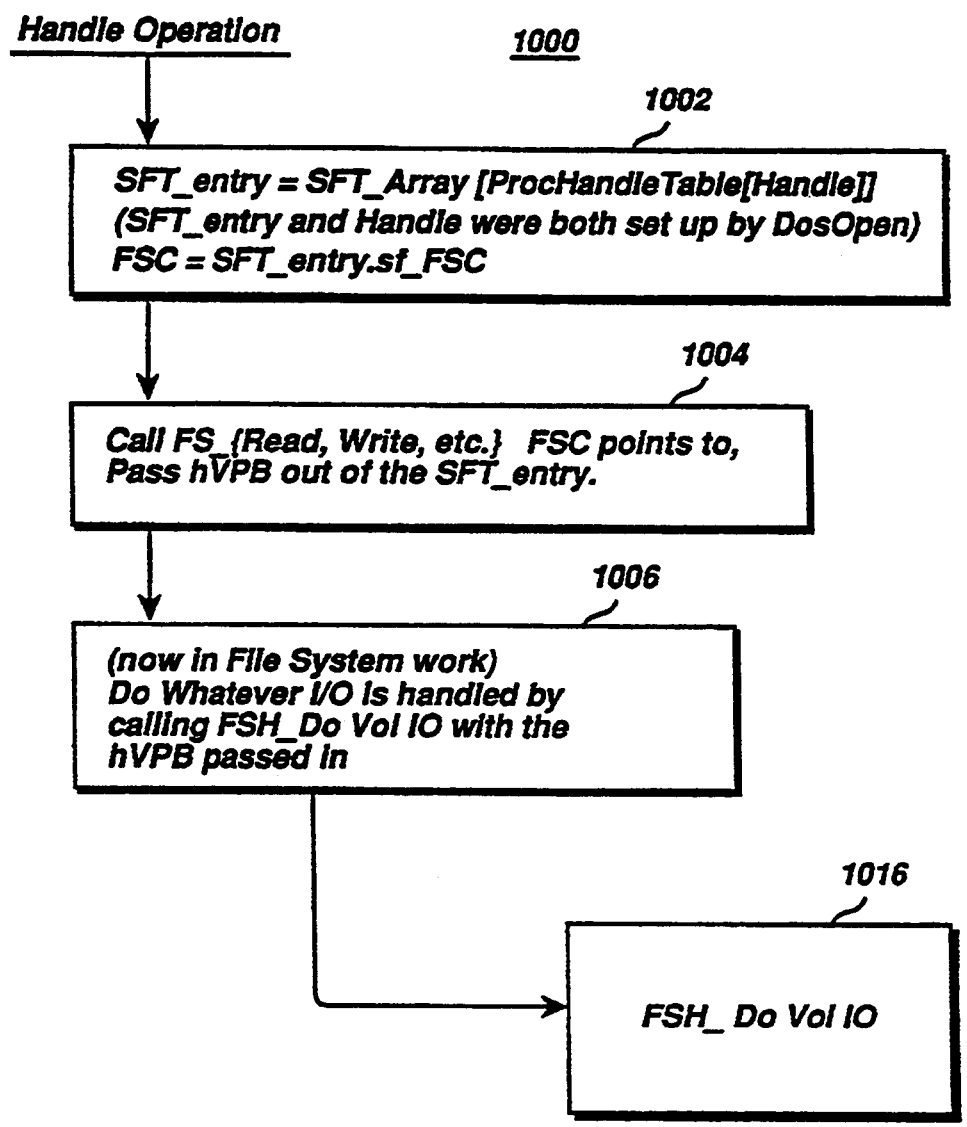
FIG. 10 is a flow diagram of the execution of handle-based operations in accordance with the principles of the present invention.

Referring now to FIG. 10, the process 1000 is invoked for handle-based operations. When invoked, item 1002 retrieves an SFT entry. The SFT entry and the handle are both set up by DosOpen. TCBThisFSC is then set as indicated. Item 1004 then calls the relevant FSD worker for the file system that FSC points to. The hVPB is passed along from the SFT entry. Item 1006 then calls item 1016 to perform any I/O requested by the caller by calling item 1016 as required.

Figure 11:
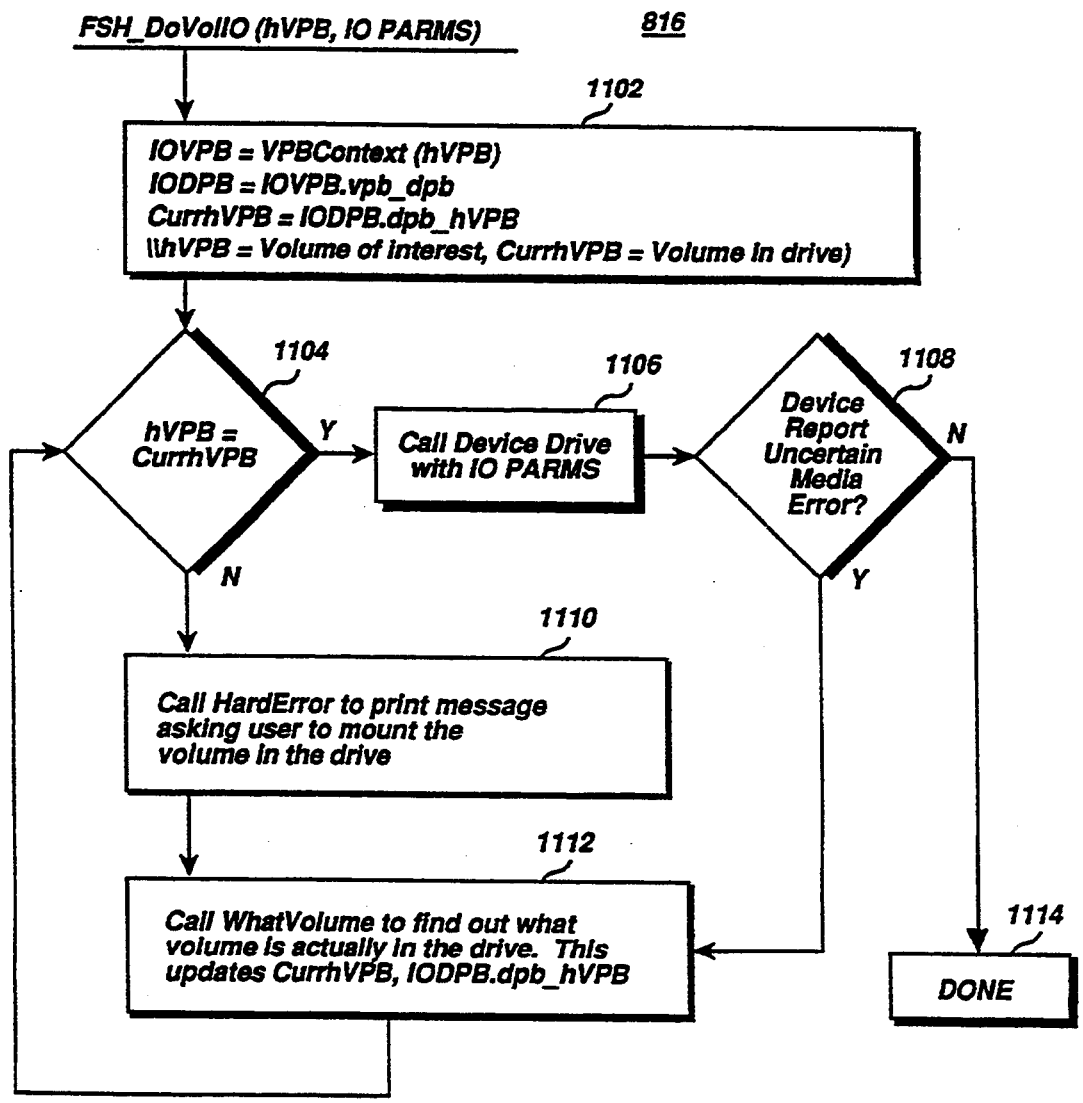
FIG. 11 is a flow diagram of the FSH_DoVolIo process invoked by the processes described in conjunction with FIGS. 8 and 10.

Referring now to FIG. 11, FSH Do Vol IO is shown. When invoked in item 1102 the hVPB is used to determine what volume is in the drive as well as the volume of interest. Decision 1104 then determines whether the volume in the drive is the volume of interest. If so, 1106 is invoked to call the device driver and to perform I/O with the parameters specified. Decision 1108 then determines whether the media went uncertain during the operation. If not, the process returns in item 1114. If decision 1108 determines the media is not uncertain, control passes to item 1112 where WhatVolume is invoked to make the media certain. Control then returns to decision 1104. If the volume in the drive does not match the volume of interest, item 1110 is invoked to call HardError to instruct the user to place the correct volume in the drive. Control then passes to item 1112 described above.

Appendices II-VII, which can be found in the application file, are included herewith as an example of an installable file system source where:

Appendix II is a listing of exported interfaces a file system is expected to support in accordance with the teachings of the present invention.

Appendix III is a listing of interfaces exported by a kernel which a file system may use.

Appendix IV is the source code of an example of an installable file system constructed in accordance with the present invention.

Appendix V is a listing of a definitions file used by the OS/2 linker to build the FSD of Appendix IV.

Appendix VI is a header file that defines structures and parameters used by the IFS of Appendix IV.

Appendix VII is a detailed listing of the disk structures used to implement the high performance file system of the present invention.

In summary, an improved high performance file system for organizing data in a volume has been described. According to the principles of the present invention, data may be organized on a disk in a series of fields wherein a first disk field comprises a boot block, a second field following said first field comprises a superblock, a third field following said second field comprises a spareblock, and a plurality of bands includes a series of contiguous sectors for storing data wherein each band includes a freespace bitmap indicating sector usage. The freespace bitmap may be located at the head or tail of the bands wherein bitmaps for alternate bands are disposed ajacent to each other. The boot block includes a volume name, a volume I.D., and a disk bootstrap program. The super block includes pointers to free space bitmaps, a bad block list, a directory block band and a root directory.

In accordance with the present invention, files and directories are anchored in an Fnode structure. wherein Fnode structure comprises a plurality of pointers which point to runs of sectors.

Accordingly, other uses and modifications will be apparent to persons of ordinary skill in the art. All such uses and modifications are intended to fall within the spirit and scope of the appended claims.

I claim:

1. A method in a computer system for tracking allocations of memory, the memory comprising a plurality of bands, each band comprising a plurality of sectors, each sector comprising a plurality of memory locations, the method comprising the steps of:

allocating a bitmap for each of the plurality of bands, each bitmap having a bit for each sector within the band;

when allocating a sector of memory, setting a bit in the bitmap of the band that contains the sector to indicate that the sector is allocated; and when deallocating a sector of memory, setting a bit in the bitmap of the band that contains the sector to indicate that the sector is deallocated.

2. The method of claim 1 wherein the step of allocating a bitmap further includes the step of selecting a portion of memory proximate to each band for the allocation of the bitmap.

3. The method of claim 1 wherein the step of allocating a bitmap further includes the step of selecting a portion of memory such that bitmaps for pairs of logically contiguous bands are allocated in logically contiguous memory locations.

4. The method of claim 1 wherein the step of allocating the bitmap further includes the step of selecting a portion of memory at a head or a tail of each band for allocation of the bitmap such that two bitmaps are allocated adjacent memory locations between alternate bands.

5. The method of claim 3 or 4 including the steps of allocating to one file a group of logically contiguous sectors from two logically contiguous bands and identifying the group of logically contiguous sectors by an indicator of a first sector and an indicator of a last sector in the group.

6. A method in a computer system for tracking the allocation of memory locations to a file, the computer system having a memory with a plurality of memory locations, the method comprising the steps of:

allocating memory locations for a file FNODE, the file FNODE having memory locations for storing indicators of variable-length runs of logically contiguous memory locations allocated to the file;

allocating a plurality of variable-length runs of logically contiguous memory locations to the file;

for each run allocated to the file, setting an indicator in the file FNODE to identify a location and length of the run; and when the number of runs exceeds the capacity of the file FNODE for storing indicators of runs, storing in the file FNODE pointers to portions of memory locations, the portions for storing indicators of the runs allocated to the file.

7. A method in a computer system for tracking the allocation of memory locations to a file, the computer system having a memory with a plurality of memory locations, the method comprising the steps of:

allocating memory locations for a file FNODE, the file FNODE having memory locations for storing indicators of variable-length runs of logically contiguous memory locations allocated to the file;

allocating a plurality of variable-length runs of logically contiguous memory locations to the file; and for each run allocated to the file, setting an indicator in the file FNODE to identify a location and length of the run wherein the indicators are stored in a tree structure.

8. The method of claim 7 wherein the tree structure is a B+ tree.

9. The method of claim 6 or 8 including the step of increasing the length of a last run of the file to indicate an increase in file size.

10. The method of claim 6 or 8 including the step of when accessing a logical location within the file, summing the lengths of a plurality of runs of the file to determine the memory location of the logical file location.

11. A method in a computer system of maintaining a directory hierarchy on a file storage device, the method comprising the steps of:

for each directory, allocating a directory FNODE, each directory FNODE having a pointer to a directory structure; and allocating a directory structure, the directory structure comprising a plurality of directory entries, each directory entry having a pointer to a file FNODE or a directory FNODE.

12. The method of claim 11 including the step of organizing the directory structure as a tree structure of directory entries.

13. The method of claim 12 including the step of organizing the tree structure as a B tree.

14. The method of claim 11 wherein the file storage device is a disk device, the method including the step of designating a band of memory locations as a directory band wherein the step of allocating a directory structure selects the directory band for allocating the directory structure.

15. The method of claim 14 wherein the step of designating a directory band designates a directory band near a seek center of the disk device.

16. The method of claim 11 including the steps of:
designating a directory as a root directory; and
storing a pointer to the directory FNODE of the root directory at a predefined location on the file storage device.

17. A method in a computer system for organizing files in a hierarchical manner on a storage device, the hierarchy of files comprising a plurality of directories and files, the storage device having a plurality of logically contiguous sectors, each sector having a plurality of logically contiguous locations, the method comprising the steps of:

allocating a descriptive block portion of the storage device, the descriptive block portion having a file system information portion and a sector allocation portion, the file system information portion having a pointer to a root directory, the sector allocation portion containing information describing the allocation of the sectors;

for each directory, allocating a directory portion of the storage device for storing information relating to the directory, the directory portion having a directory FNODE portion and a directory block portion, the directory FNODE portion containing information describing the directory, the directory block portion containing entries describing each directory and file within the directory; and for each file, allocating a file portion of the storage device for storing information relating to the file, the file portion having a file FNODE portion and a data portion, the file FNODE portion containing information identifying the file and a plurality of run indicators, each run indicator identifying a run of a plurality of logically contiguous locations, the data portion comprising a plurality of runs.

18. The method of claim 17 wherein the step of allocating a descriptive portion includes the step of allocating the sector allocation portion as a plurality of bitmaps, one bitmap associated with each band of sectors, each bitmap having a bit for each sector within the associated band, the bit indicating allocation status of the sector.

19. The method of claim 18 wherein the step of allocating the sector allocation portion as a plurality of bitmaps includes the step of allocating the bitmaps such that each bitmap is proximate to the associated band.

20. The method of claim 18 wherein the step of allocating the sector allocation portion as a plurality of bitmaps includes the step of allocating the bitmaps at a tail or a head of the associated bands such that bitmaps are adjacent between alternate bands.

21. The method of claim 18 wherein the step of allocating the sector allocation portion as a plurality of bitmaps includes the step of allocating the bitmaps such that the bitmaps for logically contiguous bands are allocated in logically contiguous sectors.

22. The method of claim 17 wherein the step of allocating a descriptive block portion includes the step of allocating the file system information portion to include a super block portion, the super block portion containing a directory block band pointer, the directory block band pointer pointing to a band of sectors in which directory blocks are stored based on a preference.

23. The method of claim 22 including the step of allocating the directory block band near a seek center of the storage device.

24. The method of claim 17 wherein the step of allocating a descriptive block portion includes the step of allocating the file system information portion to include a spare block portion, the spare block portion containing a hot fix map, the hot fix map identifying a good sector as a replacement for a bad sector.

25. The method of claim 24 including the steps of:
when a read request is directed to a bad sector, mapping the bad sector to the good sector based on the hot fix map; and
redirecting the read request to the good sector.

26. The method of claim 17 wherein the step of allocating a directory portion includes the steps of designating a band of sectors as a directory band and allocating the directory portion within the directory band.

27. The method of claim 26 wherein the step of designating designated a band of sectors near seek center of the storage device.

28. The method of claim 17 wherein the step of allocating a directory portion includes the step of allocating the directory block portion as a tree structure.

29. The method of claim 28 wherein the step of allocating the directory block portion as a B tree structure.

30. The method of claim 17 wherein the step of allocating a descriptive block portion includes the step of allocating the file system information portion to include a boot block portion, the boot block portion containing a bootstrap program.

31. The method of claim 17 wherein the step of allocating a descriptive block portion includes the step of allocating the file system information portion to include a super block portion, the super block portion containing a bitmap list pointer to a list of bitmap pointers, each bitmap pointer pointing to a bitmap that describes the allocation of a band of sectors.

32. The method of claim 17 wherein the step of allocating a descriptive block portion includes the step of allocating the file system information portion to include a spare block portion, the spare block portion containing a pointer to a free block list of unallocated sectors for use to ensure sufficient unallocated sector are available for balancing of a B tree hierarchy of directories.

33. The method of claim 17 wherein the step of allocating a directory portion includes the step of, for each entry in the directory block portion, storing a pointer to a directory FNODE or file FNODE.

34. The method of claim 17 wherein the step of allocating a file portion includes the step of allocating the plurality of run indicators as a tree directory structure.

35. The method of claim 17 wherein the step of allocating a file portion includes the step of allocating the plurality of run indicators as a B+ tree directory structure.

36. A computer system for tracking storage device allocations, comprising:
a storage device having a plurality of bands, each band having a plurality of sectors, each sector having a plurality of storage locations;
means for allocating a bitmap for each of the plurality of bands, each bitmap having a bit for each sector within the band;
means for setting a bit in the bitmap of the band that contains the sector to indicate that the sector is allocated; and
means for setting a bit in the bitmap of the band that contains the sector to indicate that the sector is deallocated.

37. The system of claim 36 including means for selecting storage locations near to each band for the allocation of the bitmap.

38. The system of claim 36 including means for selecting storage locations such that bitmaps for pairs of logically contiguous bands are allocated in logically contiguous storage locations.

39. The system of claim 36 including means for selecting storage locations at a head or a tail of each band for allocation of the bitmap such that two bitmaps are allocated adjacent storage locations between alternate bands.

40. The system of claim 38 or 39 including means for allocating to one file a group of logically contiguous sectors from two logically contiguous bands and means for identifying the group of logically contiguous sectors by an indicator of a first sector and an indicator of a last sector in the group.

41. A computer system for maintaining a directory hierarchy, comprising:
a file storage device;
means for allocating a first directory structure within the file storage device, each first directory having a pointer to a second directory structure; and
means for allocating a second directory structure within the file storage device, the second directory structure comprising a plurality of directory entries, each directory entry having an identifier of a file or a directory whereby the first directory structures and the second directory structures form a directory hierarchy.

42. The system of claim 41 including means for organizing the second directory structure as a tree structure of directory entries.

43. The system of claim 42 including means for organizing the tree structure as a B tree.

44. The system of claim 41 including means for designating a directory as a root directory, and means for storing an identifier of the first directory structure of the root directory at a location on the file storage device.

45. The system of claim 41, 42, 43, or 44 wherein the file storage device is a disk device, and including means for designating a band of memory locations as a directory band and wherein the means for allocating a second directory structure selects the directory band for allocating the second directory structure.

46. The system of claim 45 wherein the means for designating a directory band designates a directory band near a seek center of the disk device.

47. A computer system for tracking the allocation of memory locations to a file, comprising:
  a memory with a plurality of memory locations;
  means for allocating memory locations for a file node, the file node having memory locations for storing indicators of variable-length runs of logically contiguous memory locations allocated to the file;
  means for allocating a plurality of variable-length runs of logically contiguous memory locations to the file; and
  means for setting an indicator in the file node to identify a location and length of the run; and
  means for storing in the file node identifiers of portions of memory locations, when the number of runs exceeds the capacity of the file node for storing indicators of runs, the portions for storing indicators of the runs allocated to the file.

48. The system of claim 47 wherein the means for storing the indicators stores the indicators in a B+ tree.

49. A computer system for tracking the allocation of memory locations to a file, comprising:
  a memory With a plurality of memory locations;
  means for allocating memory locations for a file node, the file node having memory locations for storing indicators of variable-length runs of logically contiguous memory locations allocated to the file;
  means for allocating a plurality of variable-length runs of logically contiguous memory locations to the file; and
  means for setting an indicator in the file node to identify a location and length of the run; and
  means for storing the indicators in a tree structure.

50. The system of claim 47, 48, or 49 including means for increasing the length of a last run of the file to indicate an increase in file size.

51. The system of claim 47, 48, or 49 including means for summing the lengths of a plurality of runs of the file to determine the memory location of the logical file location when accessing a logical location within the file.

52. A computer system for organizing files in a hierarchical manner, the hierarchy of files comprising a plurality of directories and files, comprising:
  a storage device having a plurality of logically contiguous sectors, each sector having a plurality of logically contiguous locations;
  means for allocating a descriptive block portion of the storage device, the descriptive block portion having a file system information portion and a sector allocation portion, the file system information portion having an indicator of a root directory, the sector allocation portion containing information describing the allocation of the sectors;
  means for allocating a directory portion of the storage device for storing information relating to the directory, the directory portion having a directory node portion and a directory block portion, the directory node portion containing information describing the directory, the directory block portion containing entries describing each directory and file within a directory; and
  means for allocating a file portion of the storage device for storing information relating to the file, the file portion having a file node portion and a data portion, the file node portion containing information identifying the file and a plurality of run indicators, each run indicator identifying a run of a plurality of logically contiguous locations, the data portion comprising a plurality of runs.

53. The system of claim 52 including means for allocating the sector allocation portion as a plurality of bitmaps, one bitmap associated with each band of sectors, each bitmap having a bit for each sector within the associated band, the bit indicating allocation status of the sector.

54. The system of claim 53 including means for allocating the bitmaps at a tail or a head of the associated bands such that bitmaps are adjacent between alternate bands.

55. The system of claim 53 including means for allocating the bitmaps such that each bitmap is proximate to the associated band.

56. The system of claim 53 including means for allocating the bitmaps such that the bitmaps for logically contiguous bands are allocated in logically contiguous sectors.

57. The system of claim 52 including means for allocating the file system information portion to include a super block portion, the .super block portion containing a directory block band pointer, the directory block band pointer pointing to a band of sectors in which directory blocks are stored based on a preference.

58. The system of claim 57 including means for allocating the directory block band near a seek center of the storage device.

59. The system of claim 52 including means for designating a band of sectors as a directory band, and means for allocating the directory portion within the directory band.

60. The system of claim 59 including means for designating a band of sectors near seek center of the storage device.

61. The system of claim 52 including means for allocating the file system information portion to include a spare block portion, the spare block portion containing a hot fix map, the hot fix map identifying a good sector as a replacement for a bad sector.

62. The system of claim 61 including means for:
  mapping the bad sector to the good sector based on the hot fix map when a read request is directed to a bad sector, and means for redirecting the read request to the good sector.

63. The system of claim 52 including means for allocating the file system information portion to include a boot block portion, the boot block portion containing a bootstrap program.

64. The system of claim 52 including means for allocating the file system information portion to include a super block portion, the super block portion containing a bitmap list pointer to a list of bitmap pointers, each bitmap pointer pointing to a bitmap that describes the allocation of a band of sectors.

65. The system of claim 52 including means for allocating the file system information portion to include a spare block portion, the spare block portion containing a pointer to a free block list of unallocated sectors for use to ensure sufficient unallocated sector are available for balancing of a B tree hierarchy of directories.

66. The system of claim 52 including means for storing a pointer to a directory node or file node for each entry in the directory block portion.

67. The system of claim 52 including means for allocating the plurality of run indicators as a B+ tree directory structure.

68. The system of claim 52 including means for allocating the directory block portion as a B tree structure.

69. The system of claim 52 including means for allocating the plurality of run indicators as a tree directory structure.

70. The system of claim 52 including means for allocating the directory block portion as a tree structure.

* * * * *